United States Patent
Ikeda

(10) Patent No.: US 9,062,707 B2
(45) Date of Patent: Jun. 23, 2015

(54) BEARING MEMBER, END MEMBER, PHOTOSENSITIVE DRUM UNIT, PROCESS CARTRIDGE, AND METHOD FOR MANUFACTURING BEARING MEMBER

(71) Applicant: MITSUBISHI CHEMICAL CORPORATION, Chiyoda-ku (JP)

(72) Inventor: Shuichi Ikeda, Odawara (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 211 days.

(21) Appl. No.: 13/902,234

(22) Filed: May 24, 2013

(65) Prior Publication Data

US 2013/0322923 A1 Dec. 5, 2013

(30) Foreign Application Priority Data

May 30, 2012 (JP) .................................. 2012-123608
Mar. 8, 2013 (JP) .................................. 2013-047000
Apr. 1, 2013 (JP) .................................. 2013-076143

(51) Int. Cl.
| G03G 15/00 | (2006.01) |
| F16C 17/02 | (2006.01) |
| F16C 33/02 | (2006.01) |
| B29D 99/00 | (2010.01) |
| F16D 1/10 | (2006.01) |
| F16D 3/205 | (2006.01) |
| B29C 45/26 | (2006.01) |
| F16D 3/44 | (2006.01) |
| B29C 45/44 | (2006.01) |

(52) U.S. Cl.
CPC ................ *F16C 17/02* (2013.01); *F16C 33/02* (2013.01); *B29D 99/00* (2013.01); *F16D 1/10* (2013.01); *F16D 3/44* (2013.01); *G03G 15/757* (2013.01); *F16D 3/2052* (2013.01); *B29C 45/2616* (2013.01); *B29C 45/44* (2013.01)

(58) Field of Classification Search
CPC ...................................................... G03G 15/757
USPC ................................................... 399/117, 159
See application file for complete search history.

(56) References Cited

U.S. PATENT DOCUMENTS

| 2010/0034561 | A1 | 2/2010 | Batori et al. | |
| 2010/0209144 | A1* | 8/2010 | Nieda ............................ | 399/167 |
| 2011/0058851 | A1* | 3/2011 | Okabe .......................... | 399/167 |

FOREIGN PATENT DOCUMENTS

| JP | 2010-26473 | 2/2010 |
| JP | 2010-502200 | 4/2010 |

* cited by examiner

*Primary Examiner* — Ryan Walsh
*Assistant Examiner* — Philip Marcus T Fadul
(74) *Attorney, Agent, or Firm* — Oblon, McClelland, Maier & Neustadt, L.L.P.

(57) ABSTRACT

A bearing member placed at an end of a photosensitive drum, and a shaft member is attached thereto. The bearing member has a cylindrical body and a retaining portion placed in the cylindrical body, retaining a torque transmission pin provided in the shaft member, and removably provided. The retaining portion is provided with swaying grooves at least two grooves extending in an axial direction of the cylindrical body, placed opposite each other, and whose bottoms have each a curved surface exhibiting a bow with respect to the axial direction; inlet grooves at one end thereof connected to the respective swaying grooves and at the other end thereof connected to outside of the retaining portion and placed at an upstream position with respect to the swaying grooves along a direction of rotation of the cylindrical body; and a pedestal interposed, at one end, between the two swaying grooves.

22 Claims, 35 Drawing Sheets

BEARING MEMBER, END MEMBER, PHOTOSENSITIVE DRUM UNIT, PROCESS CARTRIDGE, AND METHOD FOR MANUFACTURING BEARING MEMBER

BACKGROUND OF THE INVENTION

The invention relates to a process cartridge removably fitted in an image forming apparatus, like a laser printer and a copier, a photosensitive drum unit fitted in the process cartridge, an end member attached to a photosensitive drum of the photosensitive drum unit, a bearing member that makes up of the end member, and a method for manufacturing the bearing member.

In relation to an image forming apparatus, like a laser printer and a copier, a main body of the image forming apparatus (hereinafter often mentioned as a "main body") is removably outfitted with a process cartridge.

The process cartridge is a member that forms details to be represented, such as letters and graphics, and transfers the details onto a recording medium, like paper. More specifically, the process cartridge is outfitted with a photosensitive drum, and details to be transferred are formed on the photosensitive drum. The process cartridge is additionally provided with other various means for forming details to be transferred on the photosensitive drum. For instance, developing means, electrifying means, and cleaning means can be mentioned as such means.

Modes of attachment and detachment of the process cartridge are as follows: namely, attaching and detaching an identical process cartridge to and from the main body for maintenance, detaching a consumed process cartridge from the main body for an exchange of it with a new one, and attaching a new process cartridge to the main body. It is feasible for a user of the image forming apparatus to perform such attachment and detachment of the process cartridge for himself or herself, and, from this viewpoint, easiest possible detachment and attachment of the process cartridge is desirable.

The photosensitive drum outfitted in the process cartridge is configured such that a drive shaft of the main body engages with the photosensitive drum directly or by way of another member, whereupon the photosensitive drum rotates upon undergoing torque from the drive shaft. Accordingly, in order to attach or detach the process cartridge to or from the main body, the photosensitive drum needs to be disengaged (detached) from or re-engaged (attached) with the drive shaft of the main body each time.

Now, if the photosensitive drum (the process cartridge) can be attached or detached by means of a shift along an axial direction of the drive shaft of the main body, making up the apparatus to this end will be comparatively easy. However, from the view point of miniaturization of the image forming apparatus and assuring space for attachment and detachment of the process cartridge, it is preferable that the process cartridge should be detached from the main body so as to be pulled out in another direction differing from the axial direction of the drive shaft and that the process cartridge is attached to the main body so as to be pushed in the direction.

Patent Document 1 discloses a configuration for enabling attachment and detachment of the process cartridge in another direction differing from the axial direction of the drive shaft of the main body. Specifically, a coupling member described in connection with Patent Document 1 is provided with a spherical portion, which enables the coupling member to be attached to a drum flange (a bearing member) in a swayable fashion. Accordingly, a part (a torque receiving member) that is attached to the coupling member to engage with the drive shaft of the main body can change its angle with respect to an axis line of the photosensitive drum by swaying around the spherical portion, thereby facilitating attachment and detachment of the photosensitive drum to and from the drive shaft of the main body.

Moreover, a structure described in connection with Non-Patent Document 1 includes a groove that is intended for introducing a torque transmission pin attached to a shaft member into a bearing member and that is formed in an interior periphery of the bearing member in a direction of rotation and facilitates attachment of the torque transmission pin to the bearing member. The document also describes a technique for forming such a bearing member in an integrated fashion.

[Patent Document 1] JP-A-2010-26473

Non-Patent Document

[Non-Patent Document 1] Journal of Technical Disclosure No. 2010-502200, Japan Institute of Invention and Innovation However, in the structure that is described in connection with Patent Document 1 and includes the coupling member and the drum flange (the bearing member) for retaining the coupling member, the spherical portion is held on the drum flange while the coupling member is kept swayable. Because of this structure, the spherical portion must be forcefully inserted or pulled out when being attached to the drum flange (the bearing member).

Assembly involving forceful insertion and forceful pullout might deteriorate assembly precision or fracture parts during assembly.

Patent Document 1 also describes a method for disassembling the coupling member, placing some of resultant parts on the drum flange (the bearing member), and assembling, in sequence, the remaining parts of the coupling member.

The method does not cause any problem, which would otherwise be caused by forceful insertion and forceful pullout, but entails an increase in the number of man-hours, degrading productivity. Further, another difficulty is encountered in attaching, with superior accuracy, the drum flange (the bearing member) outfitted with such a swayable coupling member to an end of the photosensitive drum.

In the meantime, under only the method described in connection with Non-Patent Document 1, it has been impossible to smoothly attach the shaft member and implement smooth swaying action of the shaft member and smooth attachment and detachment of the shaft member to and from the main body.

SUMMARY

Accordingly, in light of the problems, the invention aims at providing a bearing member, an end member, a photosensitive drum unit, and a process cartridge that all enable torque transmission and attachment to and detachment from the main body, which are tantamount to those achieved in the related art, and smoother operation and accurate, easy production by inhibiting occurrence of fractures, or the like. The invention also provides a method for producing the bearing member.

The invention is hereunder described. Reference numerals of the drawings are parenthesized in the descriptions for ease of comprehension; however, the invention is not restricted to the descriptions.

It is therefore an aspect of the invention to provide a bearing member that is placed at an end of a photosensitive drum and to which a shaft member is attached, including:
 a cylindrical body;
 a retaining portion that is placed in the cylindrical body and that retains a torque transmission pin provided in the shaft member and that is provided in a removable manner,
  the retaining portion being provided with
   at least two swaying grooves that extend along an axial direction of the cylindrical body and that are provided opposite each other and whose bottoms each have a curved surface that exhibits a bow in a direction parallel to the axial direction;
   inlet grooves that are at one end thereof connected to the respective swaying grooves and at the other end thereof connected to outside of the retaining portion and that are placed at an upstream position with respect to the swaying grooves along a direction of rotation of the cylindrical body; and
   a pedestal interposed between one ends of the two swaying grooves.

The pedestal may have a curved surface.

A center of each of the curved surfaces of the swaying grooves may substantially coincide with a center of the curved surface of the pedestal.

The curved surfaces of the swaying grooves may assume a curved surface structure that is centered on a pivot of the shaft member and that has a diameter which is substantially identical with a length of the torque transmission pin to be placed.

A distance between bottom surfaces of the mutually-opposed swaying grooves may include a region which extends from an axial end of the cylindrical body to an axial inside.

The inlet grooves may be placed so that ends of the torque transmission pin can coincide with positions of the inlet grooves at an inclined attitude of the shaft member except an attitude at which a match exists between an axial direction of the shaft member and the axial direction of the cylindrical body and attitudes at which the shaft member is swayed and most inclined.

The inlet grooves may have a transition fit size with respect to the torque transmission pin to be placed.

The bearing member may further include: a concave portion enclosed by the two swaying grooves and the pedestal, wherein
 the concave portion does not have any undercuts when viewed from an open side opposite to the pedestal along the axial direction of the bearing member; and
 one of sidewalls of each of the inlet grooves is formed from a surface of the pedestal.

The swaying grooves may not have any undercuts when the bearing member is viewed from a side opposite to the open side of the concave portion.

A surface of the pedestal on which each of the inlet grooves may be formed is inclined with respect to a radial direction of the bearing member.

All of the bearing members may be formed integrally.

Each of the inlet grooves may be formed such that a portion of the inlet groove facing the outside of the retaining portion is wider than another portion of the inlet groove facing the swaying groove.

The bearing member may be coated with a lubricant.

The bearing member may be formed from a resin containing at least one type of fluorine, polyethylene, and silicone rubber.

The bearing member may be coated with fluorine.

An end member may include:
 a shaft member and the bearing member defined in any one of the above, wherein
  the shaft member includes
   a rotary shaft;
   a torque receiving section that is placed at one end of the rotary shaft, that is capable of engagement with a torque imparting section of an image forming apparatus main body and that experiences torque from a drive shaft in an engaged attitude;
   a base end placed at another end of the rotary shaft; and
   a torque transmission pin whose ends jut out from the base end, wherein
  the shaft member is combined with the bearing member as a result of the torque transmission pin of the shaft member being placed in the swaying grooves of the bearing member.

The shaft member may be inserted into the bearing member from an end opposite to an end to which a photosensitive drum is fitted, and a combination can be realized without causing a flexure in the bearing member even when the shaft member is combined with the bearing member.

Axial movements of the shaft member may be restricted by means of the torque transmission pin.

Movements of the base end in the direction in which the shaft member may be dislodged along the axial direction are not restricted by the bearing member.

It is another aspect of the invention to provide a photosensitive drum unit having a photosensitive drum and the end member defined in any one of the above.

It is still another aspect of the invention to provide a process cartridge having the photosensitive drum unit according to the above, wherein the shaft member is removably attached to a drive shaft of the image forming apparatus main body.

It is yet still another aspect of the invention to provide a method for manufacturing the bearing member defined in the above, including:
 forming the bearing member by injection molding, wherein
  the forming step involves inserting a second molding die for making the swaying grooves into a groove formed in a first molding die for making the concave portion, combining the first molding die with the second molding die, subjecting the first molding die and the second molding die to injection molding, and releasing the bearing member from the dies by separating the first molding die and the second molding die in opposite directions.

BRIEF DESCRIPTION OF THE DRAWINGS

FIG. 26A is viewed from another direction;

DETAILED DESCRIPTION OF EMBODIMENTS

Figure 1:
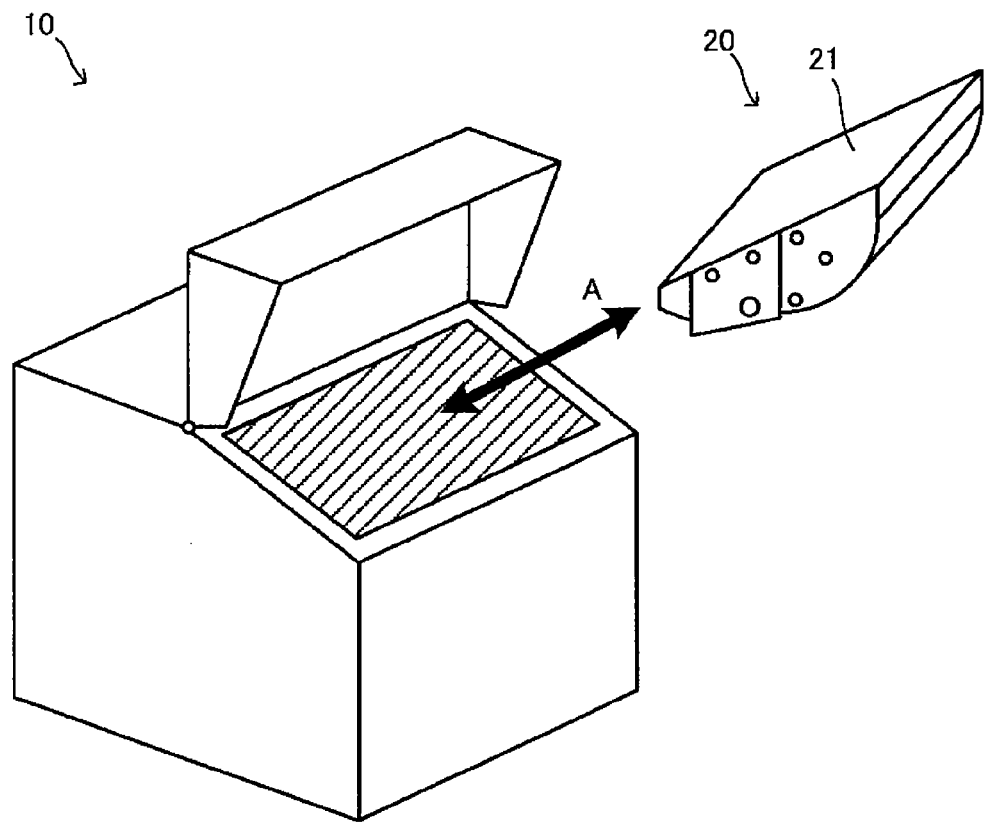
FIG. 1 is a conceptual rendering of an image forming apparatus main body and a process cartridge.

The operation and benefits of the invention that have been described above will become obvious from embodiments for implementing the invention to be described below. The invention is hereunder described by reference to the embodiments illustrated in the drawings. The invention, however, shall not be restricted to the embodiments. Further, for the sake of explanation, members are omitted from the drawings or depicted with transparency or exaggerated shapes as required.

FIG. 1 is a drawing for describing a first embodiment; namely, a perspective view schematically showing a process cartridge 20 with an end member 40 (see FIG. 2) and an image forming apparatus main body 10 (hereinafter often referred to as a "main body 10") that is used when outfitted with the process cartridge 20. As shown in FIG. 1, the process cartridge 20 can be attached to or detached from the main body 10 by being shifted in a direction designated by reference symbol A in FIG. 1. The direction is different from an axial direction of a drive shaft of the main body 10. The image forming apparatus is built from the main body 10 and the process cartridge 20. Detailed explanations are provided hereunder.

The process cartridge 20 has a housing 21 that defines a contour of the process cartridge 20, and a variety of parts are included in the housing 21. In the embodiment, the process cartridge 20 is specifically equipped with a photosensitive drum unit 30 (see FIG. 2A), an electrifying roller, a developing roller, a developing blade, a transfer roller, and a cleaning blade.

Figure 2A:
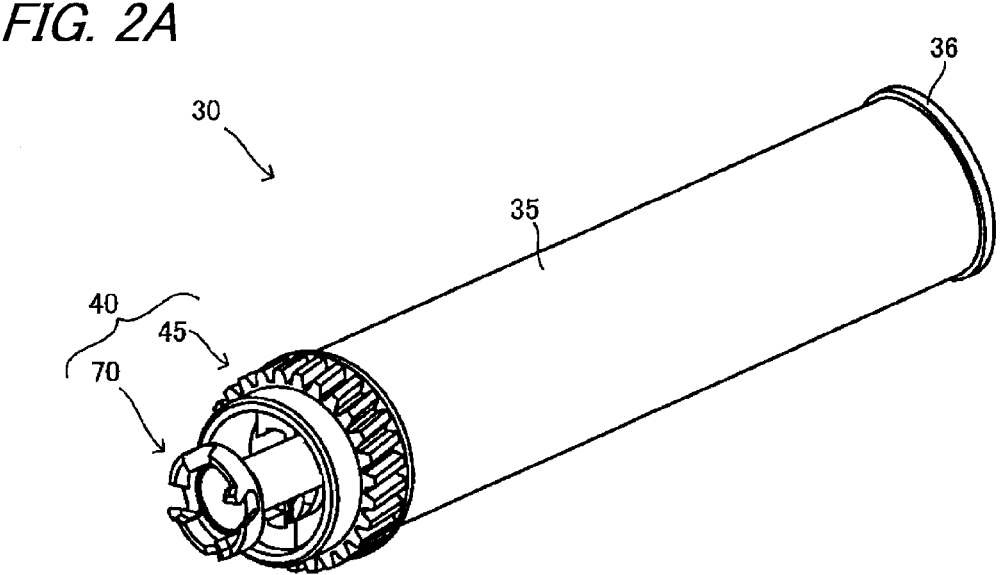
FIG. 2A is an external perspective view of a photosensitive drum unit for explaining a first embodiment.

Letters, graphics, and the like, to be transferred to a recording medium, such as paper, are generated on the photosensitive drum unit 30. FIG. 2A shows an external perspective view of the photosensitive drum unit 30. As seen from FIG. 2A, the photosensitive drum unit 30 is equipped with a photosensitive drum 35, a lid member 36, and the end member 40.

Figure 2B:
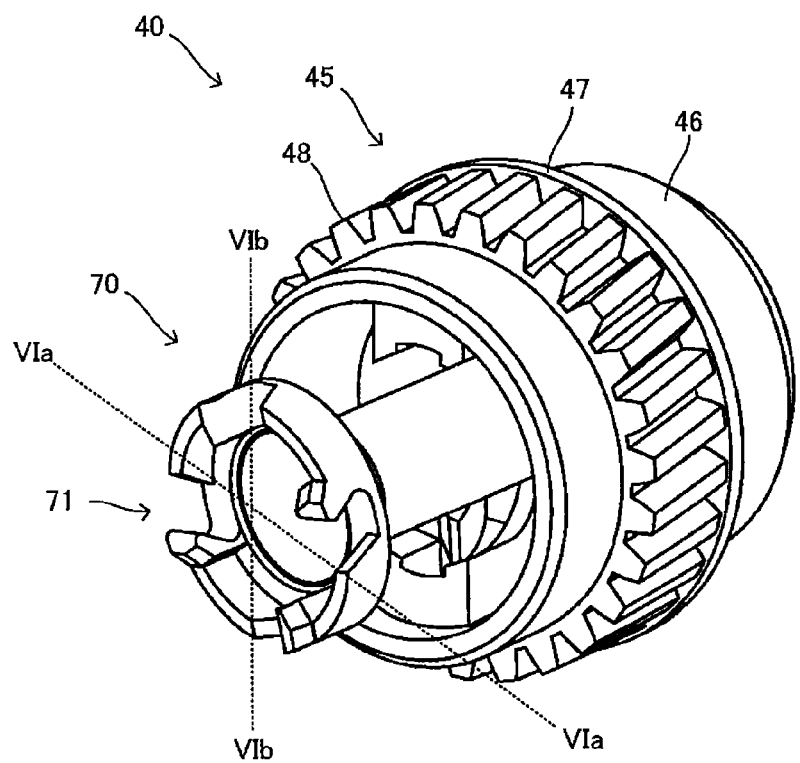
FIG. 2B is an external perspective view of an end member.

FIG. 2B shows a perspective view with attention focused on the end member 40. The photosensitive drum unit 30 is hereunder described by reference to FIGS. 2A and 2B and other drawings to be referred to when necessary.

The photosensitive drum 35 is a member manufactured by covering an exterior periphery of a drum cylinder in a tubular shape with a photosensitive layer. Specifically, the drum cylinder is composed by applying a photosensitive layer to an electrically conductive cylinder, such as an aluminum cylinder. The end member 40 is attached to one end of the photosensitive drum 35 as will be described later, and the lid member 36 is placed at the other end of the same. The drum cylinder is made cylindrical in the embodiment but can also be embodied as a columnar solid member. In this case; however, the drum cylinder is built such that at least the lid member 36 and the end member 40 are appropriately attached to respective ends of the drum cylinder.

The lid member 36 is one which is made of a resin, and a fit portion to be fitted to a cylindrical interior of the photosensitive drum 35 and a bearing portion placed so as to cover one end face of the photosensitive drum 35 are formed coaxially in the lid member 36. The bearing portion assumes a shape of a disk that covers the end face of the photosensitive drum 35 and is equipped with a region for receiving a shaft. An earth plate made from a conductive material is placed in the lid member 36 and electrically connects the photosensitive drum 35 to the main body 10.

Although an example of the lid member is mentioned in connection with the embodiment, the lid member is not restricted to the example. A lid member of another normally possible form can also be employed. For instance, a gear for transmitting torque can also be formed on the lid member. In addition, the conductive material can also be provided on the end member 40 to be described later.

The end member 40 is a member to be attached to the other-side end of the photosensitive drum 35 with respect to its end outfitted with the lid member 36 and has a bearing member 45 and a shaft member 70.

Figure 3A:
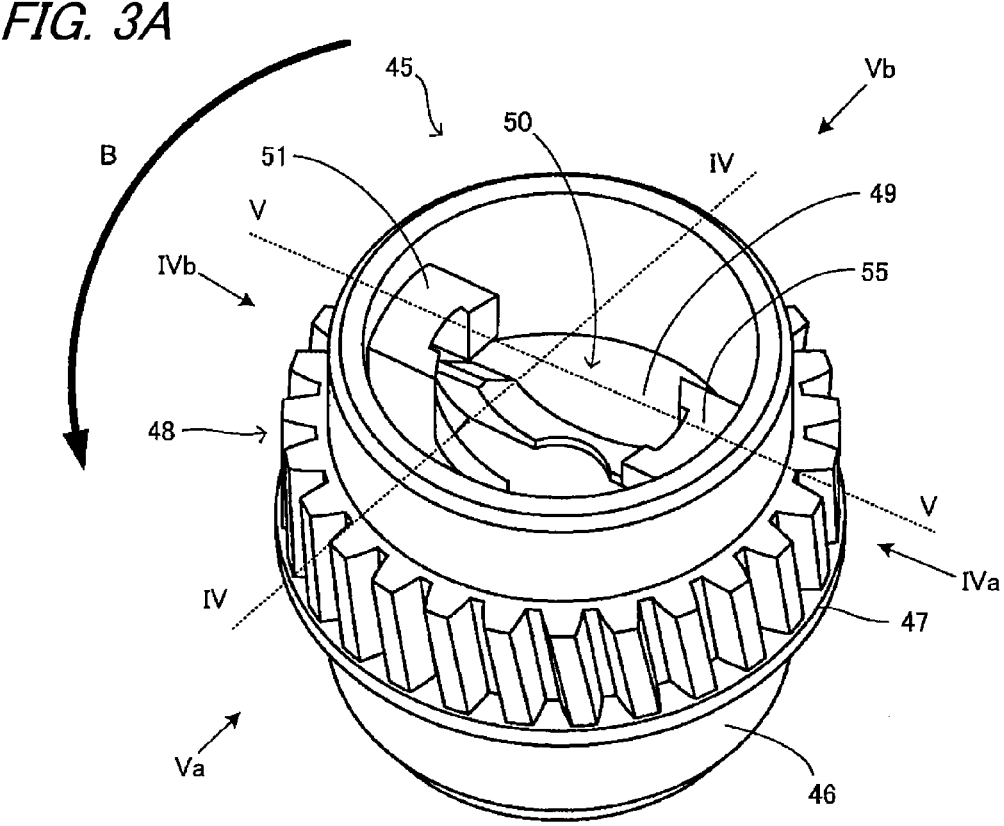
FIG. 3A is an external perspective view of a bearing member.
Figure 3B:
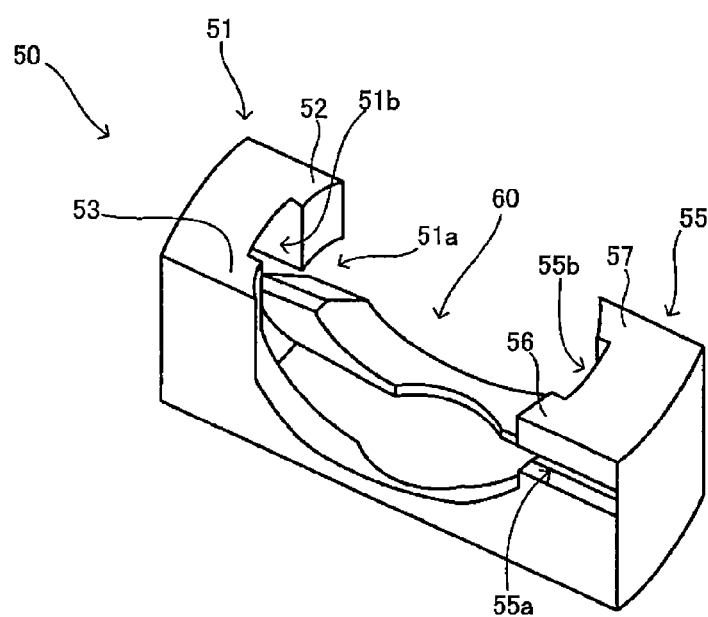
FIG. 3B is an external perspective view with attention focused on a retaining portion.
Figure 4A:
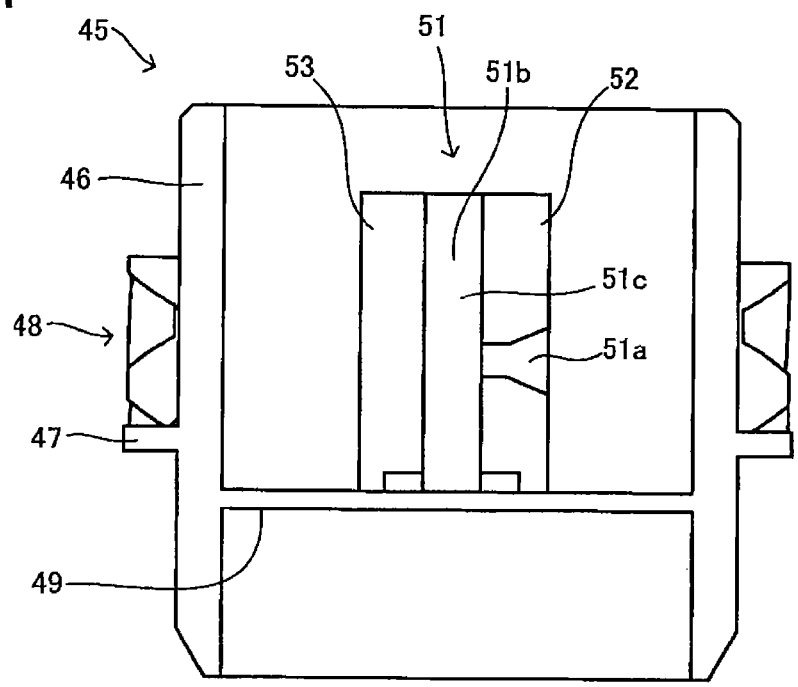
FIG. 4A is a drawing in which a cross section IV-IV shown in FIG. 3A is viewed in a direction of arrow IVa.
Figure 4B:
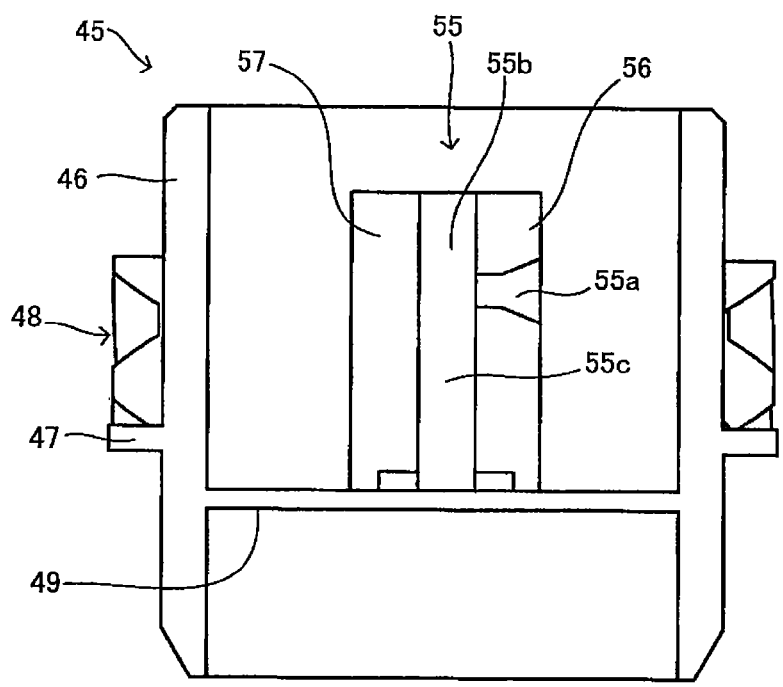
FIG. 4B is a drawing in which a cross section IV-IV shown in FIG. 3A is viewed in a direction of arrow IVb.
Figure 5A:
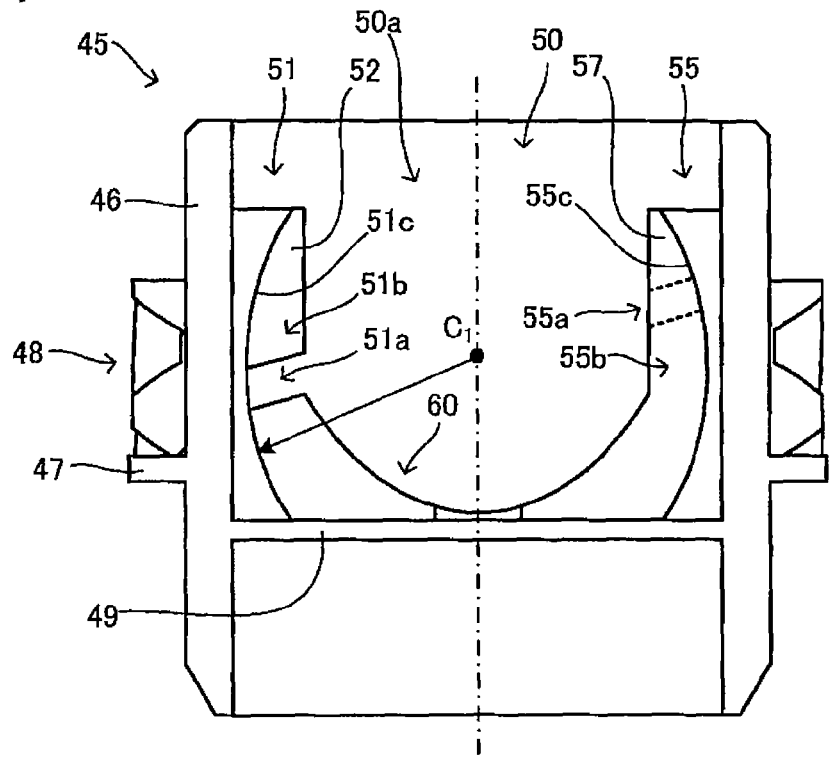
FIG. 5A is a drawing in which a cross section V-V shown in FIG. 3A is viewed in a direction of arrow Va.
Figure 5B:
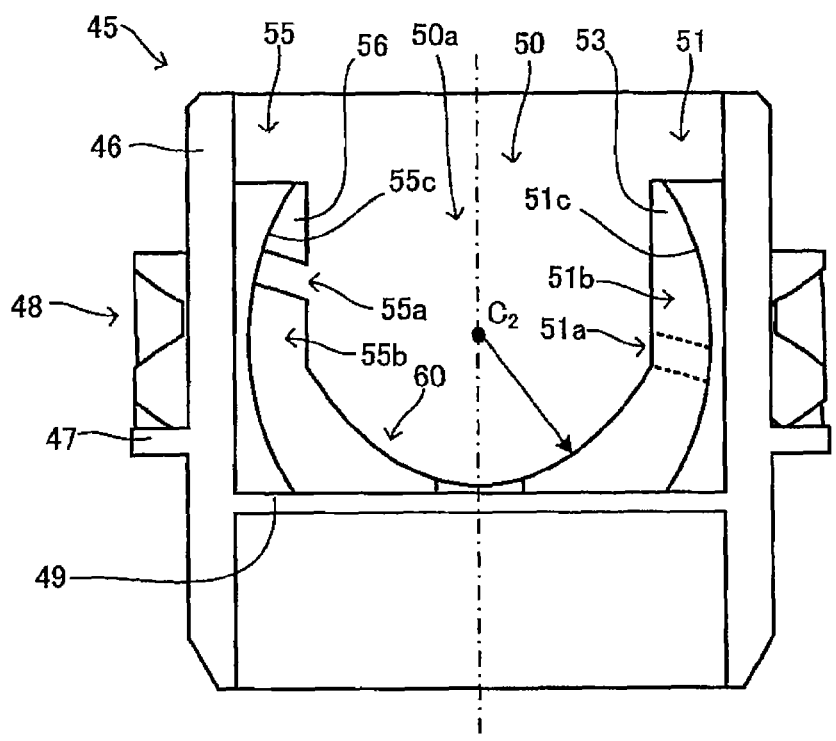
FIG. 5B is a drawing in which a cross section V-V shown in FIG. 3A is viewed in a direction of arrow Vb.

The bearing member 45 is one to be secured to the end of the photosensitive drum 35. FIGS. 3A and 3B show perspective views of the bearing member 45. FIG. 3A is a perspective view of the entirety of the bearing member 45, and FIG. 3B is a perspective view showing only a retaining portion 50 of the bearing member 45. FIG. 3A shows the end member 40 that is secured to the photosensitive drum 35, and a direction in which the bearing member 45 rotates when the end member 40 is placed in the image forming apparatus and activated is depicted by arrow B. FIG. 4A is a drawing in which a cross section IV-IV shown in FIG. 3A is viewed in a direction of arrow IVa, and FIG. 4B is a drawing in which a cross section IV-IV shown in FIG. 3A is viewed in a direction of arrow IVb. Moreover, FIG. 5A is a drawing in which a cross section V-V shown in FIG. 3A is viewed in a direction of arrow Va, and FIG. 5B is a drawing in which a cross section V-V shown in FIG. 3A is viewed in a direction of arrow Vb.

As can be seen from FIGS. 2A and 2B, FIGS. 3A and 3B, FIGS. 4A and 4B, and FIGS. 5A and 5B, in the embodiment the bearing member 45 is equipped with a cylindrical body 46 having a tubular shape. A ring-shaped contact wall 47 that stands upright along an exterior periphery of the cylindrical body 46 and a gear 48 are formed on the exterior periphery. An outer diameter of the cylindrical body 46 is approximately equal to an inner diameter of the photosensitive drum 35. One end of the cylindrical body 46 is inserted and fitted to the photosensitive drum 35, thereby securing the bearing member 45 to the photosensitive drum 35. The cylindrical body 46 is inserted at this time to a depth at which the end face of the photosensitive drum 35 comes into contact with the contact wall 47. In order to achieve a more solid secure, an adhesive can also be used. In addition, a portion of the cylindrical body 46 to be applied with an adhesive can also be given grooves or irregularities. The adhesive is eventually held by means of the grooves or irregularities, whereby adhesion between the photosensitive drum 35 and the bearing member 45 becomes more solid.

The gear 48 is one for transmitting torque to the developing roller and, in the embodiment, is embodied by a helical gear. However, a kind of the gear is not subjected to any particular limitations and can also be embodied by a spur gear. In this respect, the gear is not always indispensable.

A plate-shaped bottom plate 49 is provided at a cylindrical inside of the cylindrical body 46 so as to close at least a portion of the interior of the cylindrical body 46. The retaining portion 50 is disposed in one of interior portions of the cylindrical body 46 partitioned by the bottom plate 49, wherein the other interior portion is secured to the photosensitive drum 35.

The retaining portion 50 is a region intended for making inlet grooves 51a and 55a and swaying grooves 51b and 55b within the cylindrical body 46 and has a first groove formation region 51 and a second groove formation region 55. Further, the retaining portion 50 has a pedestal 60 interposed between one end of the first groove formation region 51 and one end of the second groove formation region 55.

The embodiment provides a description about an example in which the retaining portion 50 is equipped with mutually-opposed two (a pair of) groove formation regions (51, 55). However, the retaining portion is not restricted to the example, and four (two pairs of) groove formation regions or six (three pairs of) groove formation regions may also be provided, or a larger number of groove formation regions can also be provided.

The first groove formation region 51 is a region that makes up the inlet groove 51a and the swaying groove 51b. As can be seen from FIG. 3B, FIG. 4A, FIG. 5A and FIG. 5B, the first groove formation region 51 has two block-shaped portions; namely, a first projection 52 and a second projection 53, such that the projections jut from an interior periphery of the cylindrical body 46. The first projection 52 and the second projection 53 each take a direction parallel to an axial direction of the cylindrical body 46 as a longitudinal direction and are spaced apart from each other at a predetermined spacing along a circumferential direction of the cylindrical body 46. The spacing serves as the swaying groove 51b. Accordingly, the swaying groove 51b is one that extends parallel to the axial direction of the cylindrical body 46. Furthermore, as can be seen from FIG. 5A and FIG. 5B, a bottom surface 51c of the swaying groove 51b has a curved surface that exhibits a bow with respect to the direction parallel to the axial direction of the cylindrical body 46. It is preferable that the curved surface be formed so as to assume a circular-arc profile when viewed in cross sections of FIGS. 5A and 5B as in the case of the embodiment. It is more preferable that a center C1 of the circular arc lie on an axis line of the cylindrical body as shown in FIG. 5A.

The inlet groove 51a for establishing a mutual communication between one side and the other side is formed in the first projection 52 by cutting the first projection 52 along the circumferential direction of the cylindrical body 46. Accordingly, a groove for establishing a mutual communication from the swaying groove 51b to the other side of the first projection 52 (the outside of the retaining portion 50) with the first projection 52 sandwiched therebetween is formed from the inlet groove 51a. As can be seen from FIG. 4A, the inlet groove 51a of the embodiment is made such that the other side of the inlet groove (the outside of the retaining portion 50) becomes wider than one side of the inlet groove facing the swaying groove 51b. Moreover, as is seen from FIG. 5A, the inlet groove 51a is inclined much closer to the bottom plate 49 with an increasing distance toward the outside of the cylindrical body 46 in its radial direction.

Other structural features of the inlet groove 51a, such as an angle and a layout of the gradient, can be described in connection with the shaft member 70; hence, the explanations will be provided later.

The second groove formation region 55 is situated opposite the first groove formation region 51 with respect to the radial direction of the cylindrical body 46.

The second groove formation region 55 is a region where the inlet groove 55a and the swaying groove 55b are to be formed. As can be seen from FIG. 3B, FIG. 4B, FIG. 5A and FIG. 5B, the second groove formation region 55 has two block-shaped portions, or a first projection 56 and a second projection 57, so as to jut out from the interior periphery of the cylindrical body 46. The first projection 56 and the second projection 57 takes each a direction parallel to the axial direction of the cylindrical body 46 as a longitudinal direction and are spaced apart from each other at a given spacing along the circumferential direction of the cylindrical body 46. The spacing serves as the swaying groove 55b. Accordingly, the swaying groove 55b is one that extends parallel to the axial direction of the cylindrical body 46. Furthermore, as can be seen from FIG. 5A and FIG. 5B, a bottom surface 55c of the swaying groove 55b has a curved surface that exhibits a bow with respect to the axial direction of the cylindrical body 46. It is preferable that the curved surface be formed so as to assume a circular-arc profile when viewed in cross sections of FIGS. 5A and 5B. It is more preferable that a circular arc of the bottom surface 55c belongs to the same circle as that that includes the circular arc of the bottom surface 51c of the swaying groove 51b and that the center of the circular arc also lie in the center C1.

Therefore, as shown in FIGS. 5A and 5B, the curved surfaces are formed in such a way that a spacing between the bottom surface 51c and the bottom surface 55c becomes narrow in the embodiment at a location on an end from which the shaft member 70 is to be inserted (see FIG. 8) (i.e., a location opposite to the bottom plate 49 with the holding section 50 sandwiched therebetween) with respect to a cross section including the bottom surfaces 51c and 55c in the axial direction and that the spacing becomes wider in a predetermined segment with an increasing approach to the bottom plate 49.

The first projection 56 is provided with the inlet groove 55a that is formed by cutting the first projection 56 along the circumferential direction of the cylindrical body 46 to thus establish a mutual communication between one side and the other side of the first projection 56. Accordingly, the inlet groove 55a makes up a groove for establishing a mutual communication from the swaying groove 55b to the other side (the outside of the retaining portion 50) with the first projection 56 sandwiched therebetween. As is seen from FIG. 4B, in the embodiment the inlet groove 55a is formed such that a portion of the inlet groove 55a (facing the outside of the retaining portion 50) becomes wider than a portion of the inlet groove 55a facing the swaying groove 55b. Moreover, as is seen from FIG. 5B, the inlet groove 55a is placed at a location closer to the end of the cylindrical body 46 (i.e., a location distant from the bottom plate 49) than the inlet groove 51a and inclined so as to become further distant from the bottom plate 49 with an increasing distance toward the outside in the radial direction of the cylindrical body 46.

Other structural features of the inlet groove 55a, such as an angle and a layout of the gradient, can be described in connection with the shaft member 70; hence, the explanations will be provided later.

The pedestal 60 is disposed along the bottom plate 49 and between an end of the first groove formation region 51 and an end of the second groove formation region 55. In the embodiment, the pedestal 60 is formed so as to build a bridge between the first groove formation region 51 and the second groove formation region 55. In the embodiment, the pedestal 60 is formed so as to connect the first projection 52 of the first groove formation region 51 to the first projection 56 of the second groove formation region 55 and connect the second projection 53 of the first groove formation region 51 to the second projection 57 of the second groove formation region 55.

As is seen from FIG. 5A and FIG. 5B, the pedestal 60 of the embodiment has a curved surface that exhibits a deeper bow at the radial center of the cylindrical body 46. It is preferable that the curved surface be formed so as to assume a circular-arc shape when viewed in cross sections shown in FIG. 5A and FIG. 5B. The pedestal 60 can thereby restrict removal of a sphere 90 of the shaft member 70, which will be described later, in any directions other than the axial direction. As shown in FIG. 5B, a center C2 of the circular arc lies on the axis line of the cylindrical body 46.

As is shown in FIG. 5A and FIG. 5B, a concave portion 50a, which is surrounded by the first groove formation region 51, the second groove formation region 55, and the pedestal 60, is formed in the retaining portion 50. A portion of the concave portion 50a that is on the other side of the pedestal 60 is opened. As will be described later, the sphere 90 of the shaft member 70 is placed in the concave portion 50a. A relationship between the concave portion 50a and the shaft member 70 will be described in detail later.

Although specific restrictions are not imposed on a material used for making up the bearing member 45, a resin, like polyacetal, polycarbonate, and PPS, can be used. With a view toward enhancing rigidity of a member, glass fibers, carbon fibers, and the like, can also be mixed in the resin according to load torque. Further, in order to make smooth attachment of the shaft member to the bearing member and swaying action, a swaying property can also be enhanced by letting a resin include at least one of fluorine, polyethylene, and silicone rubber. Alternatively, the resin can also be coated with fluorine or applied with a lubricant.

Figure 6A:
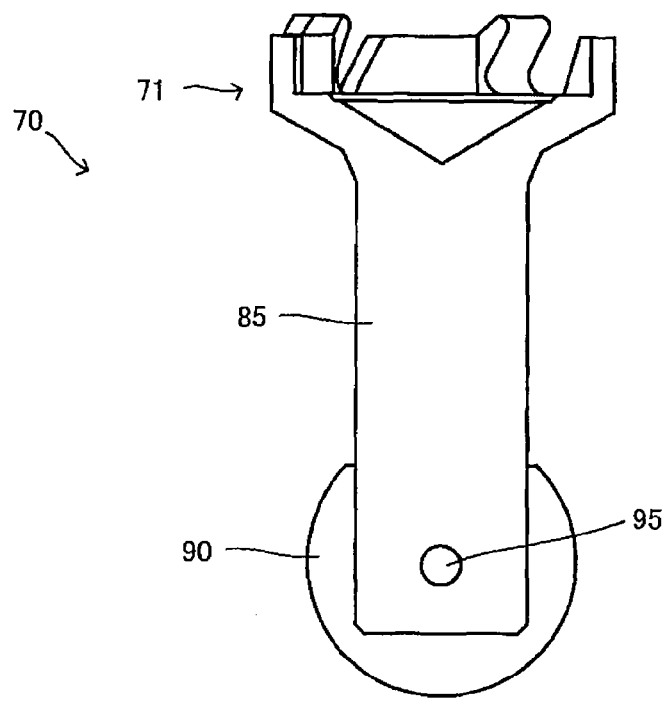
FIG. 6A is a cross sectional view of a shaft member taken along line VIa-VIa shown in FIG. 2B.
Figure 6B:
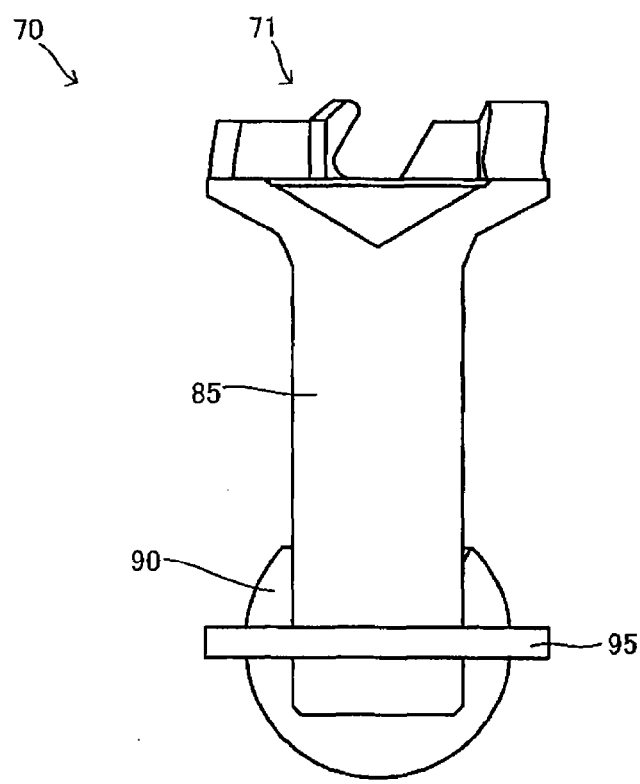
FIG. 6B is a cross sectional view of the shaft member taken along line VIb-VIb shown in FIG. 2B.

Turning back to FIGS. 2A and 2B, the shaft member 70 of the end member 40 is described. FIG. 6A shows a cross sectional view of the shaft member 70 taken along line VIa-VIa shown in FIG. 2B, and FIG. 6B shows a cross sectional view of the shaft member 70 taken along line VIb-VIb shown in FIG. 2B. As is seen from FIG. 2B, FIG. 6A, and FIG. 6B, the shaft member 70 is equipped with a coupling member 71, a rotary shaft 85, the sphere 90, and a torque transmission pin 95.

Figure 7:
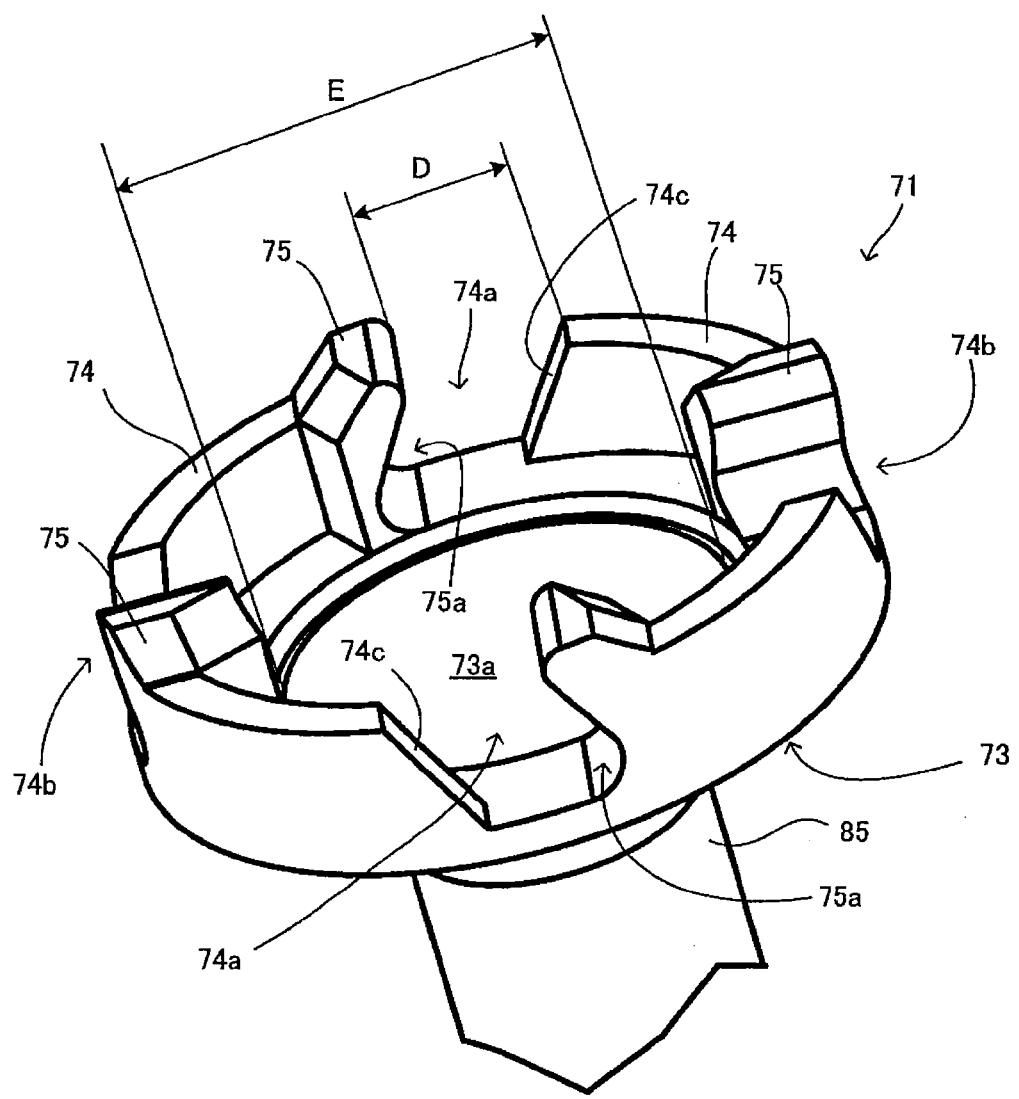
FIG. 7 is an enlarged view of a coupling member.

The coupling member 71 is a region that acts as a torque receiving part for receiving rotary drive force originating from the main body 10 (see FIG. 1). FIG. 7 shows an enlarged view of the coupling member 71. As is seen from FIG. 2B, FIG. 6A, FIG. 6B, and FIG. 7, the coupling member 71 is a circular-dish-shaped member and has a bottom 73 having on its inside a conical concave portion 73a such that a portion of the concave portion through which the axis line runs assumes the largest depth.

A cylindrical engagement wall 74 stands upright along a rim of one surface of the bottom 73 (i.e., a surface opposite to one on which the rotary shaft 85 is to be attached). The engagement wall 74 is provided with two pairs of grooves 74a and 74b that are positioned opposite with an axis line of the shaft member 70 sandwiched therebetween. A deviation of 90 degrees exists between a shaft center of the pair of grooves 74a and a shaft center of the pair of the grooves 74b.

As is well depicted in FIG. 7, a projection 75 is formed on one of side walls that make up each of the grooves 74a and 74b. Further, a dent 75a oriented in a circumferential direction is formed in a portion of the projection 75 contiguous to the bottom 73. As will be described later, pins 12 and 12 of the drive shaft 11 of the main body 10 engage with the dents 75a, whereby torque is appropriately transmitted while the drive shaft 11 is prevented from dropping off (see FIG. 14B).

Further, a slope 74c is formed on the other one of the side walls of each of the grooves 74a and 74b, thereby facilitating guiding of the pin 12 into the groove.

Accordingly, a width of the groove 74a designated by reference symbol D in FIG. 7 is made slightly larger than a diameter of the pin 12 (see FIG. 14B) and slightly smaller than a diameter of the drive shaft 11 so that the drive shaft 11 cannot pass through the groove 74a. Although an inner radius of the engagement wall 74 designated by reference symbol E shown in FIG. 7 is made slightly larger than the diameter of the drive shaft 11, they are set so as to become substantially equal to each other. Explanations will be given later to how the coupling member 71 can receive torque from the drive shaft 11.

In the embodiment, the four (two pairs of) grooves are formed in the engagement wall. However, the number of grooves is not subject to restrictions. Two (a pair of) grooves, six (three pairs of) grooves, or a larger number of grooves can also be adopted.

The rotary shaft 85 is a columnar shaft-shaped member that acts as a torque transmission section for transmitting the torque received by the coupling member 71. Accordingly, the coupling member 71 is placed at one end of the rotary shaft 85.

The sphere 90 acts as a base end and is a spherical member, as can be seen from FIG. 6A and FIG. 6B, in the embodiment. The sphere 90 is attached to the other end opposite to an end of the rotary shaft 85 where the coupling member 71 is to be placed. It is preferable that the axis line of the rotary shaft 85 and the center of the sphere 90 should coincide with each other at this time as much as possible. The photosensitive drum 35 can thereby generate more stable rotation. A diameter of the sphere 90 is made substantially equal to a length of a portion of the bearing member 45 pinched by the retaining portion 50. As will be described later, when the shaft member 70 is attached to the bearing member 45, movement of the sphere 90 in a direction in which the sphere 90 is detached from the shaft member 70 is not restricted by the retaining portion 50 of the bearing member 45.

The embodiment illustrates the case where the base end assumes an ordinary spherical shape. However, the base end is not limited to the shape and can also assume; for instance, a partially spherical shape or a combination of curved surfaces like an ovoid shape.

The torque transmission pin 95 is a columnar shaft-shaped member that passes through a center of the sphere 90 and whose both ends penetrate through the sphere 90, to thus jut out of the same. An axis line of the torque transmission pin 95 is laid so as to cross an axis line of the rotary shaft 85 at right angles.

Although a material of the shaft member 70 is not particularly limited, a resin, such as polyacetal, polycarbonate, and a PPS, can be used. In this regard, the resin can also be combined with glass fibers, carbon fibers, or the like, according to load torque with a view toward enhancing rigidity of the member. Alternatively, the rigidity of the shaft member 70 can also be further enhanced by inserting metal into the resin or by forming the entirety of the shaft member 70 from metal.

Figure 8:
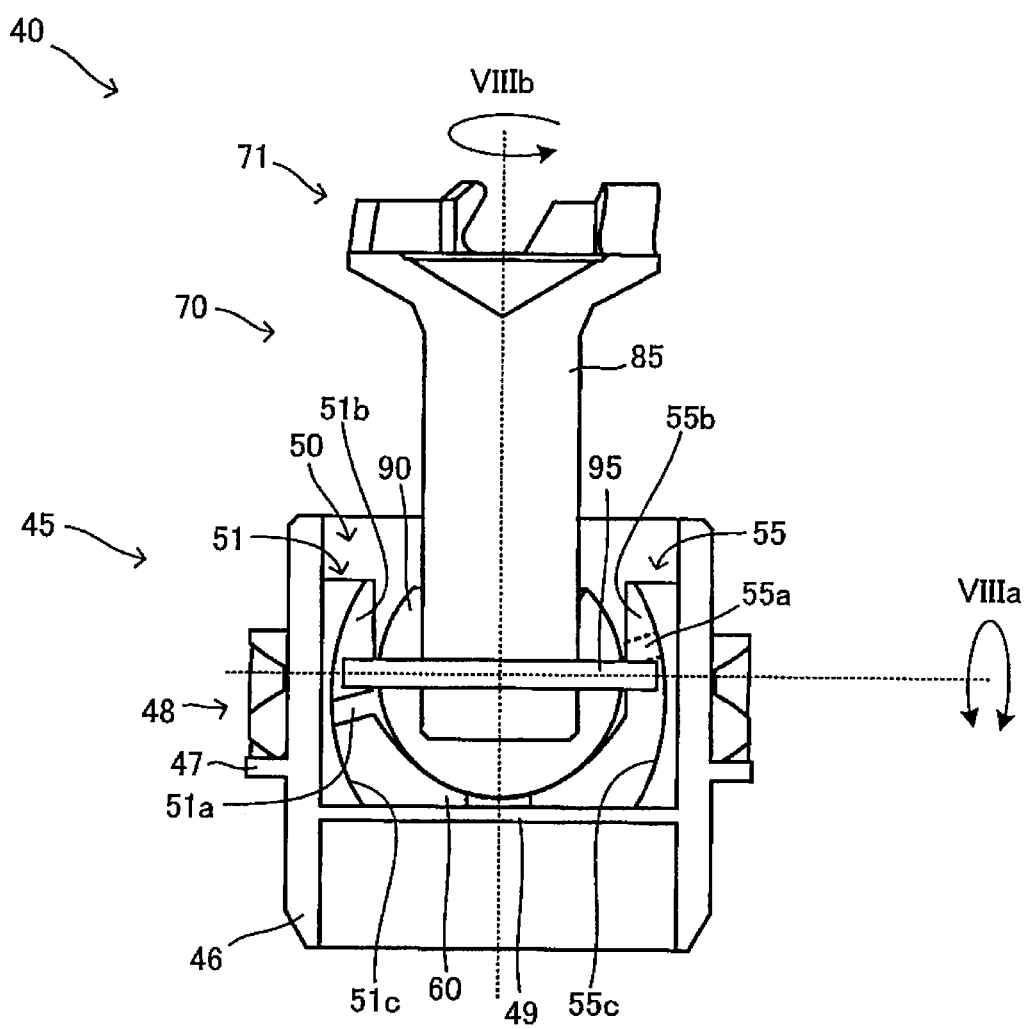
FIG. 8 is an axial cross sectional view of the end member that is taken along the line VIb-VIb shown in FIG. 2B along an axial direction.
Figure 9A:
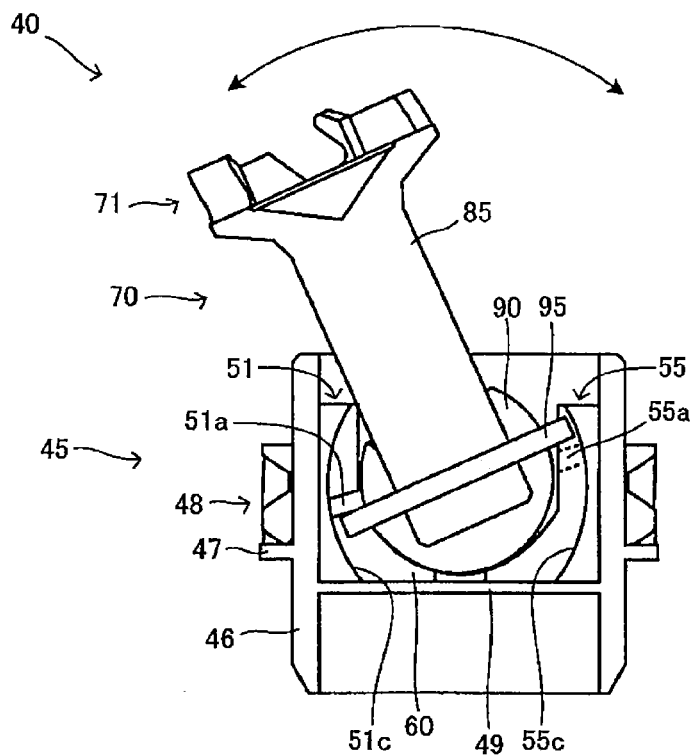
FIG. 9A is a drawing showing an attitude of the shaft member most inclined to one side when viewed from the same viewpoint as that in FIG. 8.
Figure 9B:
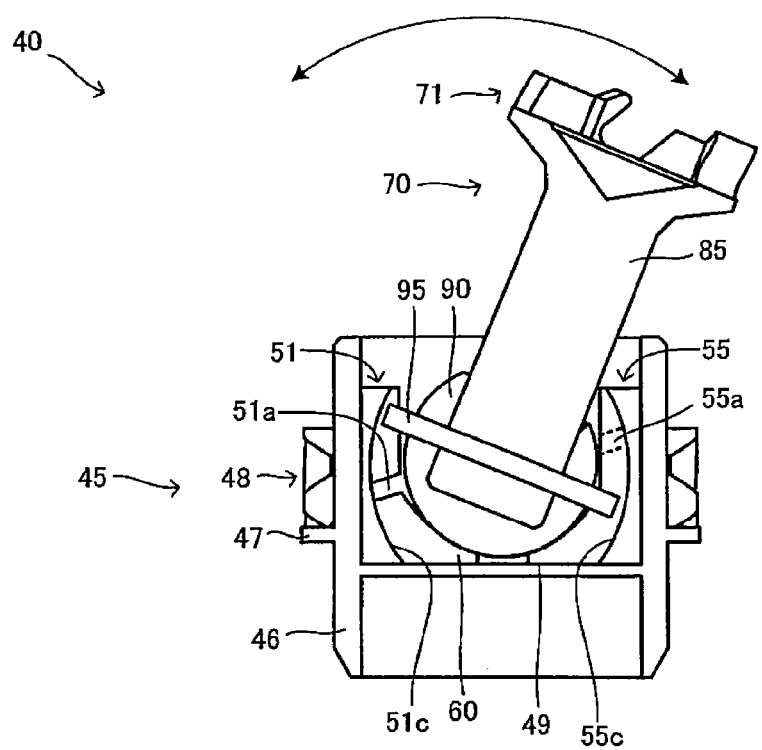
FIG. 9B is a drawing showing an attitude of the shaft member most inclined to the other side when viewed from the same viewpoint as that in FIG. 8.

The shaft member 70 is attached to the bearing member 45 as follows, thereby materializing the end member 40. FIG. 8 is an axial cross sectional view of the end member 40 that is taken along the line VIb-VIb shown in FIG. 2B; FIG. 9A is a drawing showing an attitude of the shaft member 70 most inclined to one side when viewed from the same viewpoint as that in FIG. 8, and FIG. 9B is a drawing showing an attitude of the shaft member 70 most inclined to the other side when viewed from the same viewpoint as that in FIG. 8.

As is seen from FIG. 8, the sphere 90 of the shaft member 70 is placed within a space defined by the concave portion 50a that is enclosed with the first groove formation region 51 and the second groove formation region 55 of the retaining portion 50 and the pedestal 60. The ends of the torque transmission pin 95 that jut out of the sphere 90 are inserted, one in the swaying groove 51b of the first groove formation region 51 and the other in the swaying groove 55b of the second groove formation region 55. The shaft member 70 is thereby retained by the bearing member 45.

Here, "swaying groove" is a groove that receives both ends of the torque transmission pin movably, and one specific embodiment of the swaying groove will be described hereinafter.

As a result of the shaft member 70 being placed within the bearing member 45 as above, the shaft member 70 can turn (swaying) around the axis line of the torque transmission pin 95 as designated by reference numeral VIIIa shown in FIG. 8. Specifically, the shaft member 70 can be turned (swayed) around the torque transmission pin 95 between a near side and a far side in the drawing sheet of FIG. 8.

As shown in FIG. 9A and FIG. 9B, the shaft member 70 can also turn (swaying) in a direction orthogonal to the turn (swaying) designated by reference symbol VIIIa; namely, a direction in which the axis line of the torque transmission pin 95 itself sways. This becomes feasible as a result of both ends of the torque transmission pin 95 moving through interiors of the swaying grooves 51b and 55b. In the embodiment, the bottom surface 51c of the swaying groove 51b and the bottom surface 55c of the swaying groove 55b have each a circular-arc shape as above. Hence, even when the shaft member 70 undergoes swaying as shown in FIG. 9A and FIG. 9B, the shaft member 70 can be prevented from shifting, as if it were greatly wobbled, in the direction of the axis line and the direction orthogonal to the axis line (i.e., a horizontal direction in the drawing sheet of FIGS. 9A and 9B).

More specifically, although the bottom surface 51c of the swaying groove 51b and the bottom surface 55c of the swaying groove 55b are curved as above, the circular arc of the bottom surface 51c of the swaying groove 51b and the circular arc of the bottom surface 55c of the swaying groove 55b lie on a pivot of the shaft member 70. It is preferable that a diameter of each of the circular arcs substantially coincide with a length of the torque transmission pin 95. Wobbling of the shaft member 70 can thereby be inhibited.

Upon experiencing torque from the main body 10, the shaft member 70 undergoes torque centered around the axis line of the shaft member as designated by reference symbol VIIIb shown in FIG. 8. One end of the torque transmission pin 95 of the shaft member 70 gets snagged on a groove side surface (a groove sidewall) of the swaying groove 51b of the first groove formation region 51, and the other end of the torque transmission pin 95 gets snagged on a groove side surface (a groove sidewall) of the swaying groove 55b of the second groove formation region 55, so that the torque can be transmitted to the bearing member 45 and also to the photosensitive drum 35.

Figure 10:
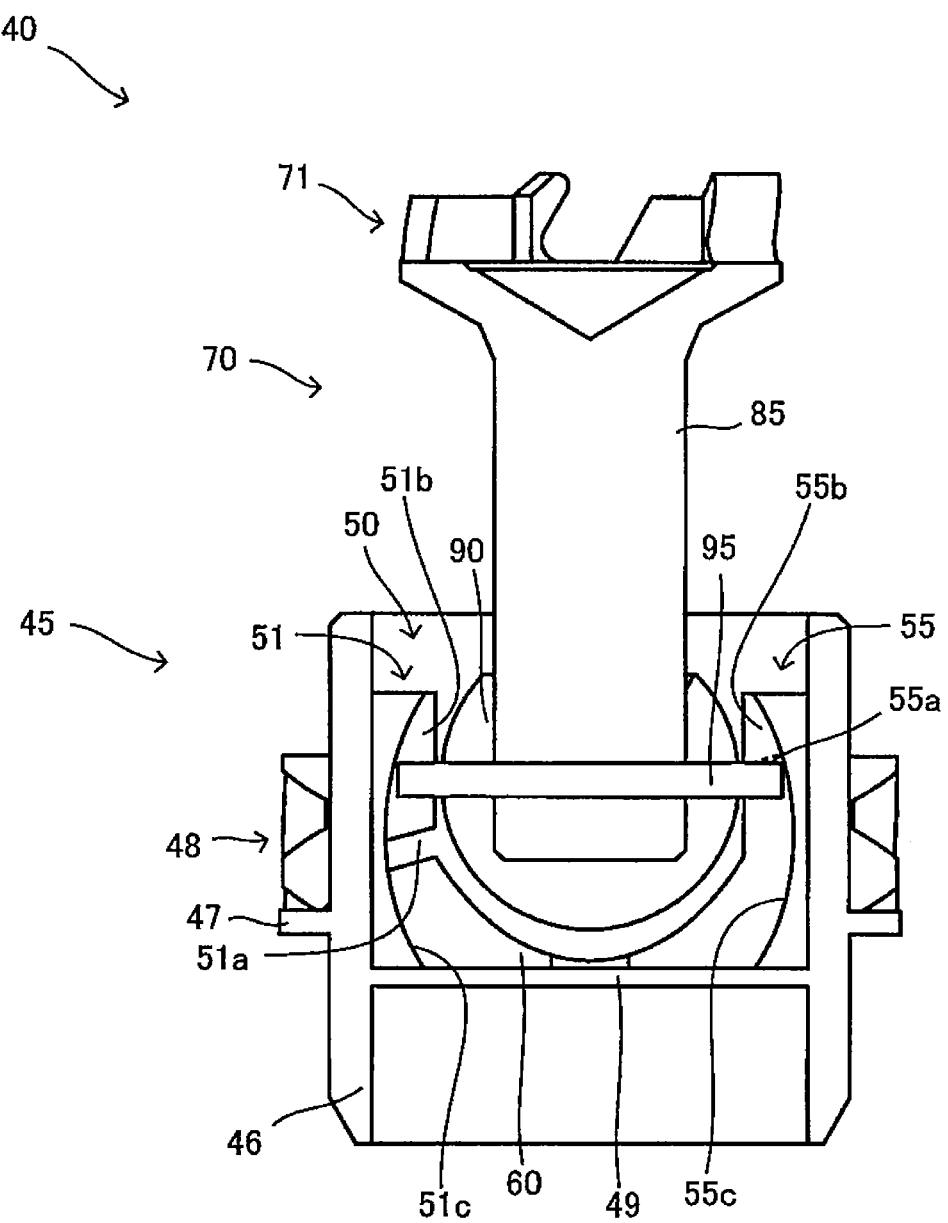
FIG. 10 is a drawing showing a state of the shaft member and a state of the bearing member achieved in a scene where the shaft member is pulled in the axial direction.

FIG. 10 is a drawing showing a state of the shaft member 70 and a state of the bearing member 45 achieved in a scene where the shaft member 70 is pulled in the axial direction. Since the swaying grooves 51b and 55b are curved in a circular-arch shape, spacing between the swaying groove 51b and the swaying groove 55b becomes smaller toward the end of the bearing member 45 (an open side of the concave portion 50a). A narrow spacing between the grooves is made smaller than the length of the torque transmission pin 95. Accordingly, even when the shaft member 70 is pulled in the axial direction, the torque transmission pin 95 gets snagged on the bottom surface 51c of the swaying groove 51b and the bottom surface 55c of the swaying groove 55b as shown in FIG. 10; hence, the shaft member 70 stays on the bearing member 45. As is obvious from the above, axial movements of the shaft member 70 are regulated by the torque transmission pin 95.

Moreover, in relation to regulation of axial movements, it is preferable that the shaft member 70 be regulated such that the shaft member is prevented from moving in the axial direction as well as coming off the bearing member 45 in the axial direction. Wobbling of the shaft member 70, which would otherwise occur when the shaft member 70 is attached to the bearing member 45, is thereby prevented, whereby swaying of the shaft member 70 and attachment/detachment of the process cartridge 20 to the main body 10 also becomes much smoother.

To this end; for instance, the following configuration can be adopted. Specifically, as shown in FIG. 8, the essential requirement is that the sphere 90 should be placed in contact with the pedestal 60 and that the center location of the sphere 90 achieved in a swayable state should coincide with the center location of the axis line of the pin 95 which is achieved when the shaft member 70 is pulled in the axial direction as shown in FIG. 10. The shaft member 70 cannot substantially move in the axial direction, so that wobbling of the shaft member 70 can be prevented.

The center C1 (see FIG. 5A), which is common to the curved surface of the bottom surface 51c of the swaying groove 51b and the curved surface of the bottom surface 55c of the swaying groove 55b, and the center C2 of the curved surface of the pedestal 60 are determined from the above-mentioned viewpoint, and it is preferable that both the centers C1 and C2 be substantially identical with each other. The term "substantially identical" means that unintended, unavoidable deviation between the center locations is considered as the same center location. Accordingly, deviation between the center locations, which falls within a range of manufacturing dimensional errors and tolerance, is taken as the same center location.

When the curved surface of the bottom surface 51c of the swaying groove 51b, the curved surface of the bottom surface 55c of the swaying groove 55b, and the curved surface of the pedestal 60 each assume a circular-arc cross sectional profile, such as that shown in FIG. 5A and FIG. 5B, it is preferable that the center location C1 of the circular arcs and the center location C2 of the circular arc should be substantially identical with each other.

As can be seen from the drawings, the inlet grooves 51a and 55a are placed in such a way that a leading edge of the torque transmission pin 95 does not coincide with the location of the inlet groove 51a or the location of the inlet groove 55a at an attitude where the shaft member 70 coincides with the axis of the bearing member 45, such as that shown in FIG. 8, an attitude where the shaft member 70 is most inclined, such as that shown in FIG. 9A and FIG. 9B, and an attitude where the shaft member 70 is pulled in the axial direction, such as that shown in FIG. 10. Accordingly, the shaft member 70 will not become dislodged from the bearing member 45 in the attitudes, and the shaft member 70 can properly act without becoming inadvertently dislodged from the bearing member 45.

Figure 11A:
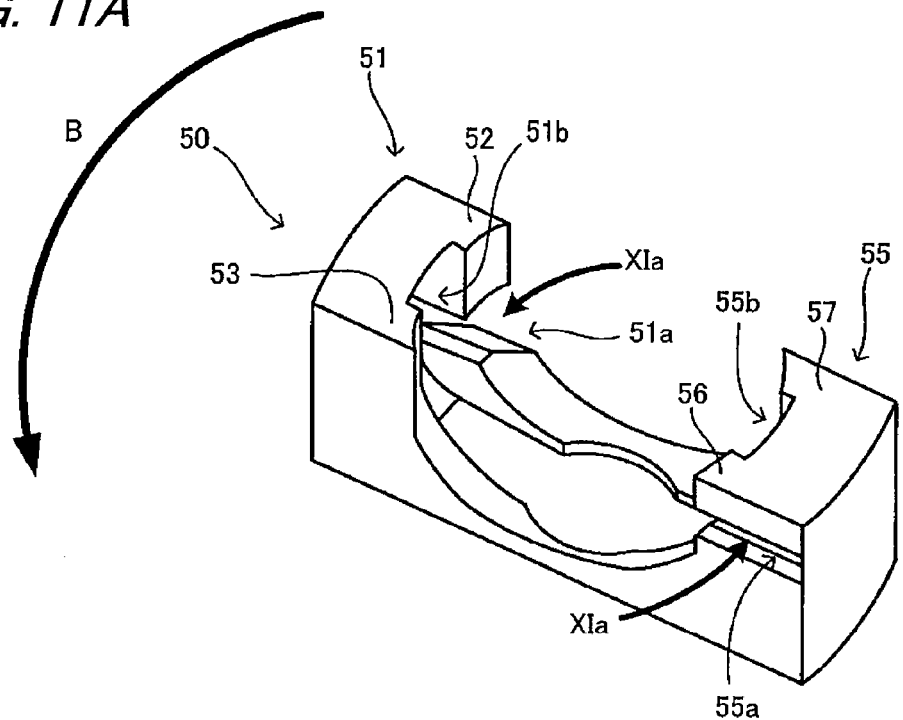
FIG. 11A is a perspective view of the retaining portion, showing motion of a torque transmission pin by arrow XIa.
Figure 11B:
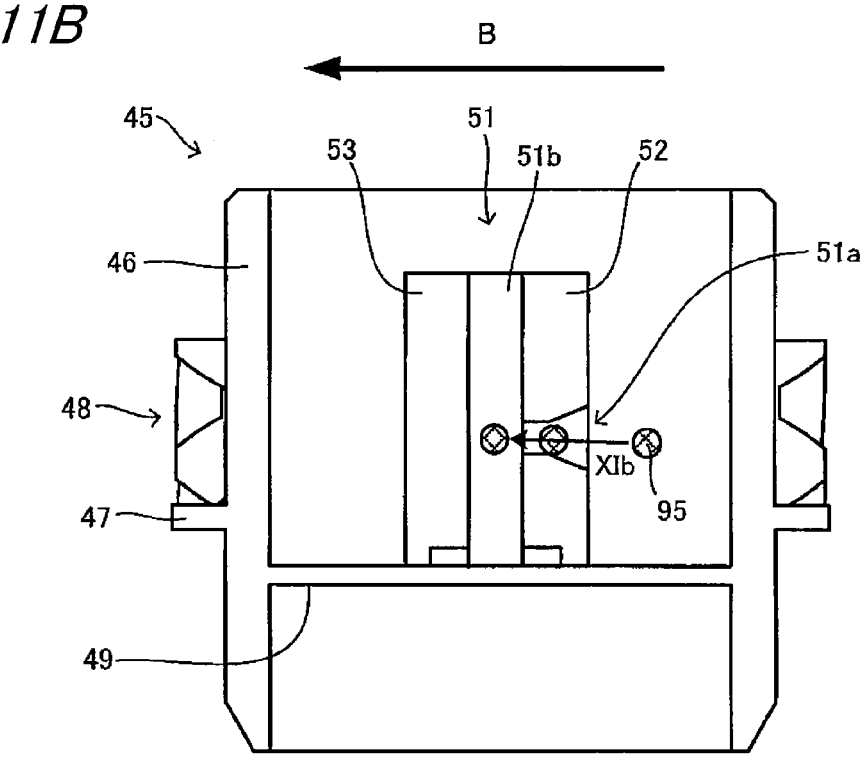
FIG. 11B is a cross sectional view of the bearing member in which a first groove formation region is on a front side, showing the torque transmission pin by a hatched circle.
Figure 12:
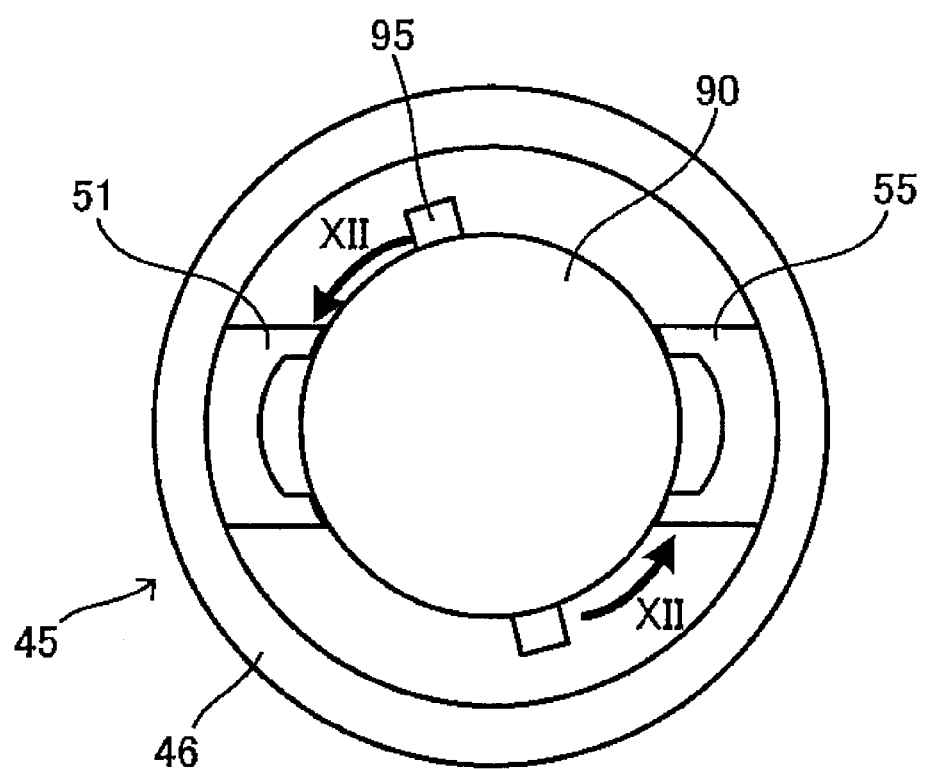
FIG. 12 is a schematic view of the end member that is viewed in a direction along which the axis runs from a back to a front of a drawing sheet, showing the motion of the torque transmission pin by arrows XII.
Figure 13:
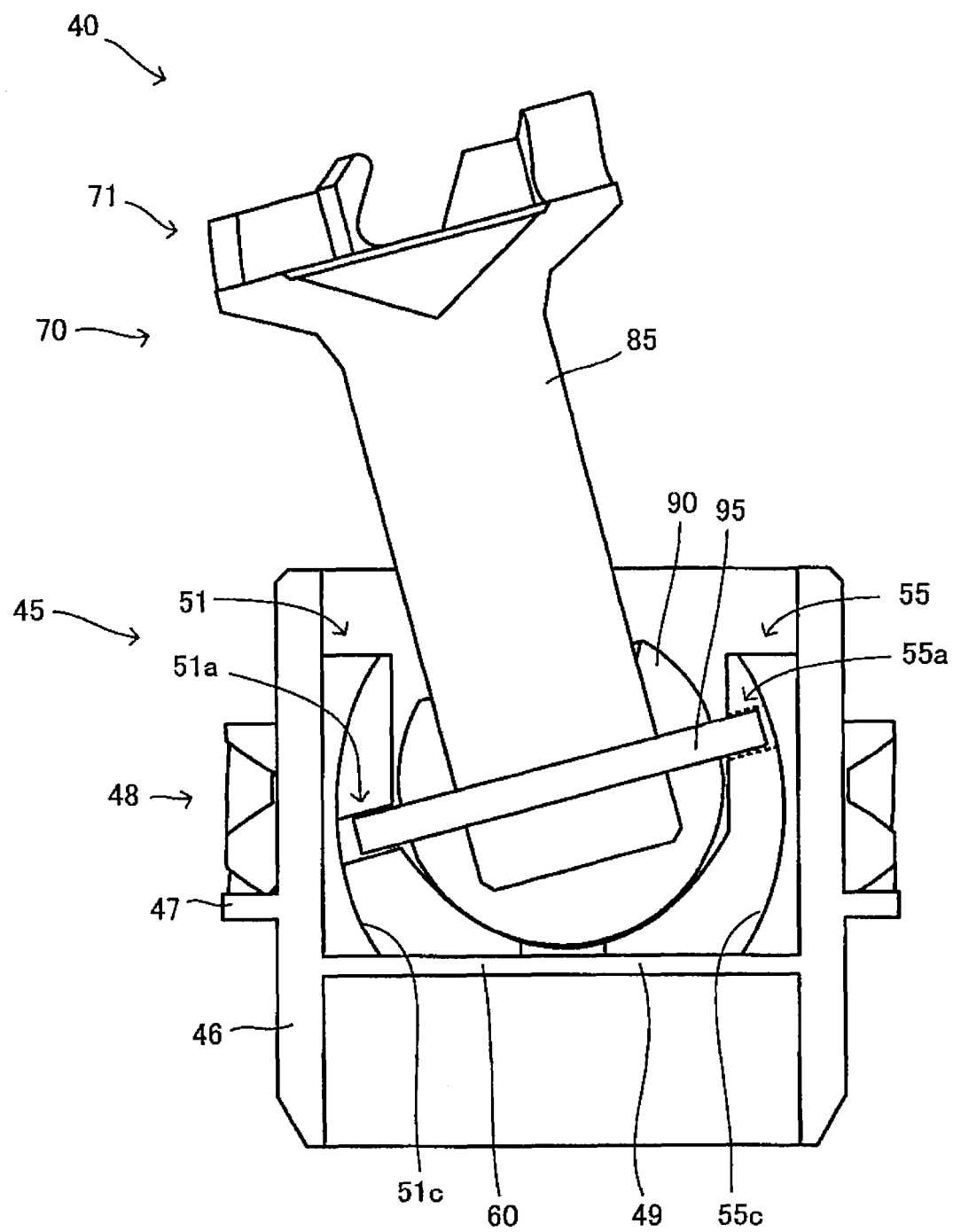
FIG. 13 is a cross sectional view of the end member, showing an attitude of the end member achieved when the shaft member is attached to the bearing member.

A method for mounting the shaft member 70 to the bearing member 45 is now described. FIGS. 11A and 11B and FIGS. 12 and 13 provide drawings for explanations. FIG. 11A is a perspective view of the retaining portion 50, showing motion of the torque transmission pin 95 by arrow XIa; and FIG. 11B is a cross sectional view of the bearing member 45 in which the first groove formation region 51 is on a front side, showing a location of an extremity of the torque transmission pin 95 by a hatched circle. FIGS. 11A and 11B show, by reference symbol B, a direction in which the bearing member 45 turns when the image forming apparatus operates (in the same way as does FIG. 3A). FIG. 12 is a schematic view of the end member 40 that is viewed in a direction along which the axis runs from a back to a front of the drawing sheet, showing the motion of the torque transmission pin 95 by arrows XII. FIG. 13 is a cross sectional view of the end member 40, showing an attitude of the end member 40 achieved when the shaft member 70 is attached to the bearing member 45.

Attaching the shaft member 70 to the bearing member 45 can be performed in a way shown in FIGS. 11A and 11B and FIG. 12. Specifically, the sphere 90 is interposed between the first groove formation region 51 and the second groove formation region 55 in such a way that the torque transmission pin 95 of the shaft member 70 comes to the outside of the first groove formation region 51 and the second groove formation region 55 as shown in FIG. 12. Subsequently, the shaft member 70 is turned in directions designated by arrow XII shown in FIG. 12, arrow XIa shown in FIG. 11A, and arrow XIb shown in FIG. 11B, whereupon both ends of the torque transmission pin 95 move through the interior of the inlet groove 51a of the first groove formation region 51 and the interior of the inlet groove 55a of the second groove formation region 55. Thus, the ends of the torque transmission pin 95 can be moved into the swaying groove 51b and the swaying groove 55b, respectively. The shaft member 70 can thereby be attached to the bearing member 45.

The inlet grooves 51a and 55a are in the embodiment formed such that one side of the individual inlet groove (facing the outside of the retaining portion 50) has a wider groove width than that its other side facing the swaying groove 51b or 55b. This facilitates insertion of the torque transmission pin 95 into the inlet grooves 51a and 55a. The remaining portion of the individual inlet groove except the portion with the wider groove width is not particularly restricted in terms of a groove width, so long as the torque transmission pin 95 can pass through the groove. However, it is preferable that the groove width should be a so-called transition fit size. Here, "transition fit size" is defined by the Japanese Industrial Standard, JIS B 0401 (1998). Inadvertent dislodgement of the shaft member 70 from the bearing member 45 can thereby be prevented.

In this regard, in order to move the ends of the torque transmission pin 95 through the interior of the inlet groove 51a and the interior of the inlet groove 55a by turning the shaft member 70 as mentioned above, the shaft member 70 must be inclined as shown in FIG. 13, to thus align the ends of the torque transmission pin 95 to the locations of the respective inlet grooves 51a and 55a.

The position corresponds to an attitude shown in FIG. 13, or an attitude that falls in a range between the attitude shown in FIG. 8 at which the shaft member 70 coincides with the axial direction of the bearing member 45 and the attitude at which the shaft member 70 is most inclined to either side as shown in FIGS. 9A and 9B. Accordingly, locations at which the inlet groove 51a and the inlet groove 55a are to be placed also conform to the position.

There is apprehension that the shaft member 70 may become dislodged from the bearing member 45 during turning or swaying operation of the shaft member 70. However, once the torque transmission pin 95 of the shaft member 70 has been placed in the swaying grooves 51b and 55b, the ends of the torque transmission pin 95 do not coincide with the inlet grooves 51a and 55a, as contrasted with the foregoing, at any one of the attitudes shown in FIG. 8 and FIGS. 9A and 9B that the shaft member 70 usually assumes. The shaft member 70 thus properly operates without becoming dislodged from the bearing member 45 as above.

It is also preferable that the inlet grooves 51a and 55a be placed respectively on an upstream projection of the first groove formation region 51 and an upstream projection of the second groove formation region 55 with respect to a rotating direction of the photosensitive drum 35 among the first projections 52 and 56 and the second projections 53 and 57 (namely, the first projections 52 and 56 as can be seen from the fact that the rotating direction is designated by reference symbol B in FIG. 3A and FIGS. 11A and 11B in the embodiment). As a result, dislodgement of the shaft member 70 from the bearing member 45, which would otherwise occur during rotation of the photosensitive drum 35, can be prevented more thoroughly.

By means of the structure, such as that mentioned above, the shaft member 70 is retained by the bearing member 45 while turning (swaying) and transmitting torque. The end member 40 can be attached to the photosensitive drum 35 in; for example, the following manner.

Specifically, the bearing member 45 of the end member 40 is first fitted into the photosensitive drum 35. Fitting is carried out by inserting a portion of the bearing member 45 opposite to the open side of the concave portion 50a of the retaining portion 50 into the photosensitive drum 35. Since the turnable (swayable) shaft member 70 is not yet attached to the bearing member 45 at this time, the bearing member 45 can be easily, stably fitted into the photosensitive drum 35. Subsequently, the shaft member 70 is attached to the bearing member 45 attached to the end of the photosensitive drum 35. Attachment of the shaft member 70 can also be readily performed as mentioned above without entailing push operation with great force, or the like. Accordingly, flexing the bearing member is also not needed when the shaft member is combined with the bearing member.

The related-art end member needs to be fitted into the photosensitive drum after the shaft member is attached to the bearing member. Difficulty is sometimes encountered in fitting the end member to the photosensitive drum because of presence of the swayable shaft member. Further, even in the related-art end member, the bearing member is attached to the photosensitive drum in advance, and subsequently the shaft member can be attached to the bearing member. Forceful attaching action, however, is required at that time, which worsens precision. In contrast, the end member 40 of the embodiment is easily attached as mentioned above, and worsening precision is not induced. In addition, the shaft member can be easily attached to the bearing member and hence readily reused.

By means of such an end member 40, appropriate torque is imparted to the photosensitive drum 35 at the time of loading the process cartridge 20, and easy attachment and detachment of the process cartridge 20 become feasible.

Turning back to FIG. 1, continued explanations are given to the process cartridge 20. The other structural elements provided at the inside of the housing 21 of the process cartridge 20; in other words, an electrifying roller, a developing roller, a developing blade, a transfer roller, and a cleaning blade are as follows.

The electrifying roller electrifies the photosensitive drum 35 by a voltage applied by the main body 10. The electrifying roller rotates while keeping up with the photosensitive drum 35 and contacts an exterior periphery of the photosensitive drum 35, whereby electrification is carried out.

The developing roller is one which feeds developing powder to the photosensitive drum 35. An electrostatic latent image created over the photosensitive drum 35 is developed by the developing roller. Stationary magnet is accommodated in the developing roller.

The developing blade is one which controls a quantity of developing powder to adhere to an exterior periphery of the developing roller and also imparts frictional electric charge to the developing powder itself.

The transfer roller is one for transferring the image created over the photosensitive drum 35 to a recording medium, such as paper.

The cleaning blade is one which contacts the exterior periphery of the photosensitive drum 35 to thereby eliminate the developing powder still remaining on the periphery after transfer by use of a leading edge of the blade.

The rollers are rotatably accommodated in the housing 21; in other words, each of the rollers rotates within the housing 21, as required, to thus fulfill its function.

Of the shaft member 70 of the photosensitive drum unit 30, at least the coupling member 71 is placed while exposed outside the housing 21. As will be described later, torque can be acquired from the main body 10, whereby attaching and detaching the process cartridge 20 to and from the main body 10 becomes facilitated.

The rollers and the blades outfitted to the process cartridge 20 have been described thus far, members provided in the process cartridge 20 are not limited to them. It is preferable that the process cartridge be outfitted with members, parts, and the developing powder, and other, which are usually provided in a process cartridge.

The main body 10 is now described. The main body 10 of the embodiment is a laser printer. The laser printer operates with the process cartridge 20 in a loaded attitude. When creating an image, the laser printer electrifies the photosensitive drum 35 by use of the electrifying roller while rotating the same. The photosensitive drum 35 is in this state exposed to a laser beam that reflects image data, by use of various optical members provided in the laser printer, whereby an electrostatic latent image based on the image data is obtained. The latent image is developed by the developing roller.

In the meantime, a recording medium, such as paper, is set in the main body 10 and transported to a transfer position, by means of a feed roller, a conveyor roller, and others, provided in the main body 10. The transfer roller is disposed at the transfer position. A voltage is applied to the transfer roller as the recording medium passes through the transfer roller, whereupon the image is transferred onto the recording medium from the photosensitive drum 35. Subsequently, heat and pressure are applied to the recording medium, whereby the image is fixed on the recording medium. The recording medium on which the image is created is output from the main body 10 by means of an output roller, and the like.

As above, the main body 10 imparts torque to the photosensitive drum unit 30 with the process cartridge 20 in the loaded attitude. Explanations are now given to how the main body 10 imparts torque to the photosensitive drum unit 30 with the process cartridge 20 in a loaded attitude.

Figure 14A:
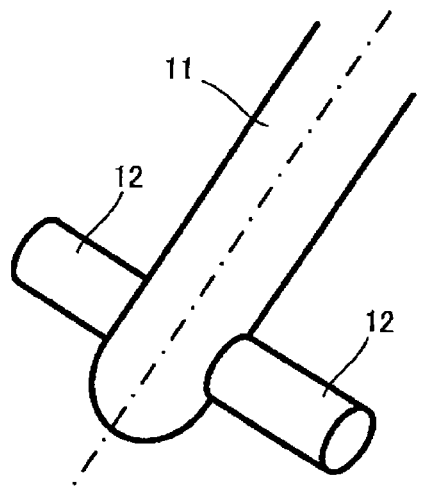
FIG. 14A is a perspective view showing a drive shaft and a pin of an image forming apparatus main body and the drive shaft.

The torque is imparted to the process cartridge 20 by the drive shaft 11 that serves as a torque imparting section of the main body 10. FIG. 14A shows a shape of a leading edge of the drive shaft 11. As is seen from FIG. 14A, the drive shaft 11 is a columnar shaft member whose leading edge forms a semi-spherical surface with the columnar pin 12 that juts in a direction orthogonal to an axis of rotation designated by dashed lines and that serves as a torque imparting section. A train of gears is formed on a portion of the drive shaft 11 opposite to its extremity shown in FIG. 14A so that the drive shaft 11 can rotate around the shaft center. The drive shaft 11 is connected to a motor, which is the drive source, by way of the train of gears.

The drive shaft 11 is juttingly laid on a pathway of movements for attachment and detachment at substantially right angles to the direction shown in FIG. 1 in which the process cartridge 20 is moved for attachment to and detachment from the main body 10. In addition, the drive shaft 11 only rotates without moving along the axial direction. Accordingly, the shaft member 70 must be attached to and detached from such a drive shaft 11 at the time of attachment and detachment of the process cartridge 20. The foregoing end member 40 facilitates attachment and detachment of the shaft member 70 to and from the drive shaft 11. Specific modes of attachment and detachment will be described in detail later.

Figure 14B:
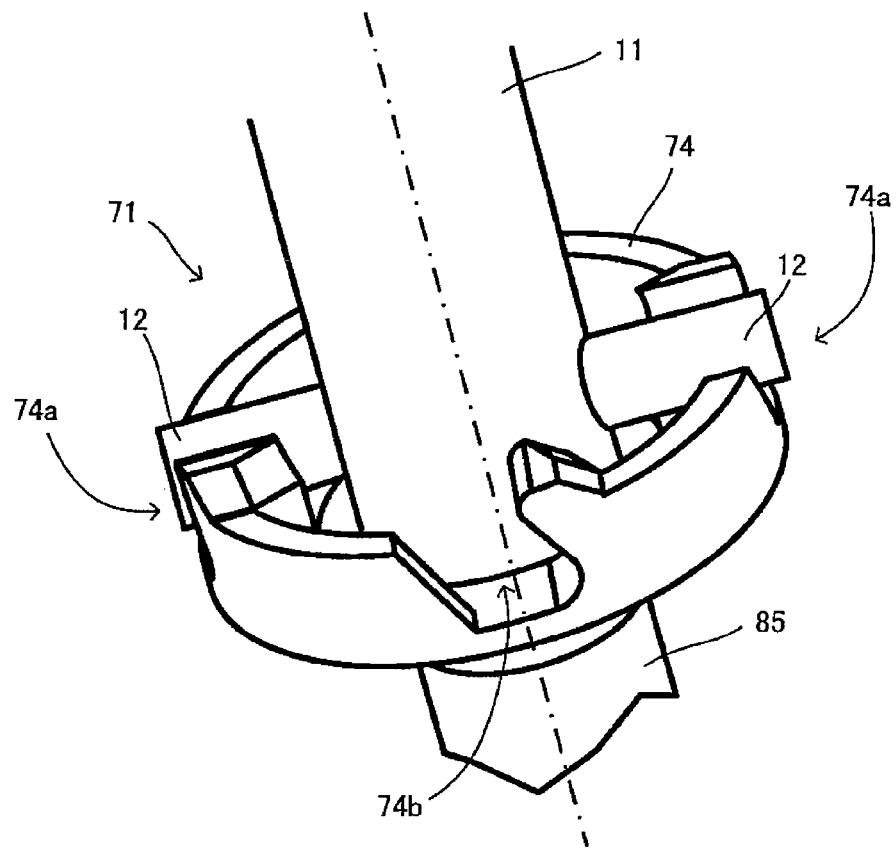
FIG. 14B is a drawing for explaining an attitude of the coupling member when the pin is coupled to the coupling member.

The drive shaft 11 is engaged with the coupling member 71 of the shaft member 70 of the end member 40 with the process cartridge 20 loaded in the main body 10, whereby torque is transmitted. FIG. 14B shows a scene in which the coupling member 71 of the end member 40 is engaged with the drive shaft 11. As is seen from FIG. 14B, the drive shaft 11 and the coupling member 71 are placed while butting against each other such that an axis line of the drive shaft 11 and an axis line of the coupling member 71 coincide with each other with the drive shaft 11 engaged with the coupling member 71. The pins 12 of the drive shaft 11 are placed in the mutually-opposed grooves 74a or 74b of the coupling member 71 at this time (FIG. 14B shows a case where the pins 12 are placed in the respective grooves 74a). The coupling member 71 is thereby rotated while keeping up with rotation of the drive shaft 11, so that the photosensitive drum unit 30 also rotates.

As above, the attitude at which torque is transmitted corresponds to an attitude at which the drive shaft 11 and the coupling member 71 are coaxially arranged in terms of the axis line and at which the pins 12 stay in the grooves 74a or 74b of the coupling member 71.

Figure 15A:
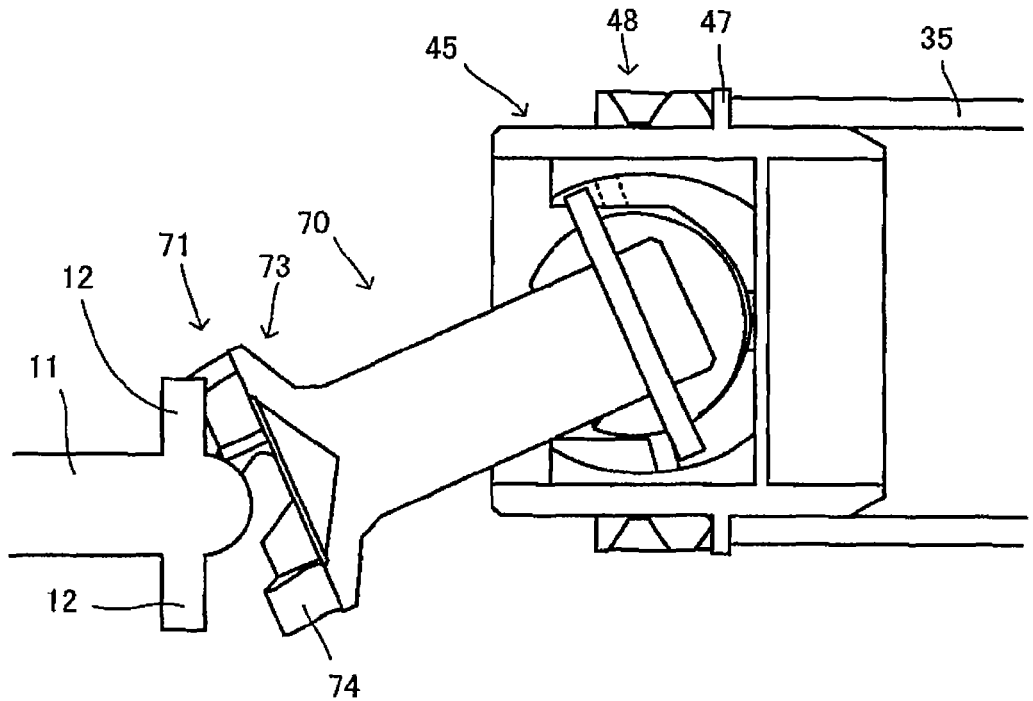
FIG. 15A is a drawing for explaining an example scene in which the process cartridge is attached to the main body.
Figure 15B:
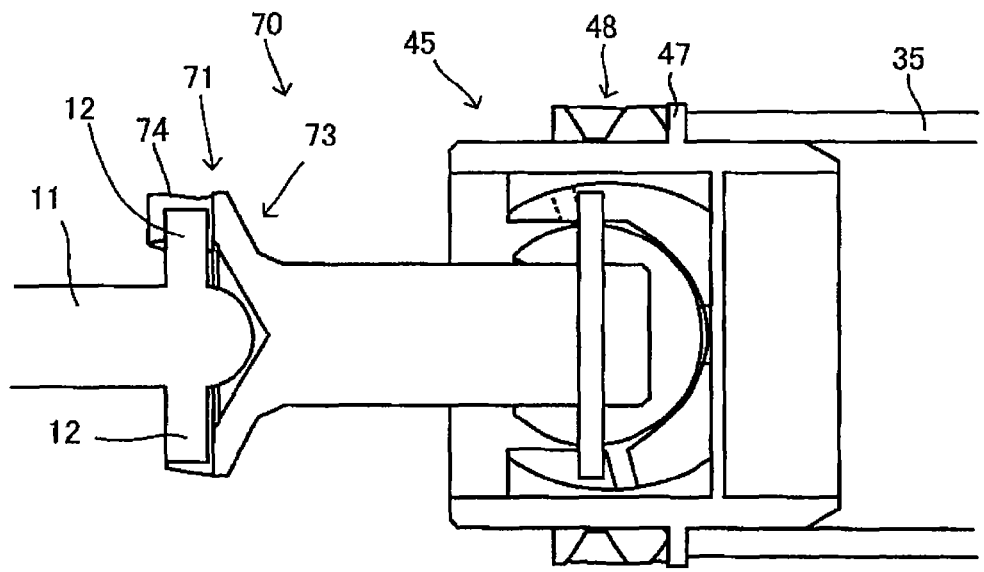
FIG. 15B is a drawing for explaining another example scene in which the process cartridge is attached to the main body.

Explanations are now given to an example of operation of the drive shaft 11 and operation of the photosensitive drum unit 30 that are performed when the process cartridge 20 is loaded into the main body 10. FIGS. 15A and 15B provide explanatory views. FIG. 15A is a drawing for explaining one scene in which the end member 40 is engaged with the drive shaft 11, and FIG. 15B is a drawing showing another scene in which the end member 40 is engaged with the drive shaft 11. FIGS. 15A and 15B show a sequence of operation, and a horizontal direction of the drawing sheets corresponds to the axial direction. The drawings show a scene in which the process cartridge 20 is moved downward in the drawing sheet, to thus be loaded into the main body.

First, as shown in FIG. 15A, the coupling member 71 of the shaft member 70 is held inclined toward the drive shaft 11. It is preferable that the attitude be one in which the shaft member 70 is most inclined. When the process cartridge 20 is moved from the attitude in a downward direction in the drawing, the extremity of the drive shaft 11 comes into contact with an interior of the bottom 73 of the coupling member 71 and the engagement wall 74 so as to get snagged on them. When the process cartridge 20 is additionally thrust into the main body 10, the drive shaft 11 that has contacted so as to get snagged on the coupling member 71 rotates the shaft member 70, which remains inclined with respect to the shaft direction, so as to approach the axis line. The pins 12 are thereupon inserted into the respective grooves 74a.

Additionally thrusting the process cartridge 20 in the loading direction, the shaft line of the inclined shaft member 70 is brought in line with the shaft line of the drive shaft 11 as shown in FIG. 15B. Further, the shaft line of the drive shaft 11, the shaft line of the shaft member 70, the shaft line of the bearing member 45, and the shaft line of the photosensitive drum 35 come in line with each other, whereupon an attitude, such as that shown in FIG. 14B, is achieved. Torque is thereby, appropriately imparted from the drive shaft 11 to the shaft member 70, the bearing member 45, the photosensitive drum 35, and finally to the process cartridge 20.

Meanwhile, when the process cartridge 20 is detached from the main body 10, the essential requirement for the drive shaft 11 and the photosensitive drive unit 30 is to operate the other way round.

As above, the process cartridge 20 can be detached from the main body 10 as if it were pulled in a direction which differs from the axial direction of the drive shaft 11 of the main body 10 and also attached to the main body 10 as if it were thrust into the same.

A second embodiment is hereunder described. Explanations will be provided with attention paid to a region which differs from the process cartridge 20 of the first embodiment, and explanations about the features common to the process cartridge 20 will be omitted for brevity.

Figure 16A:
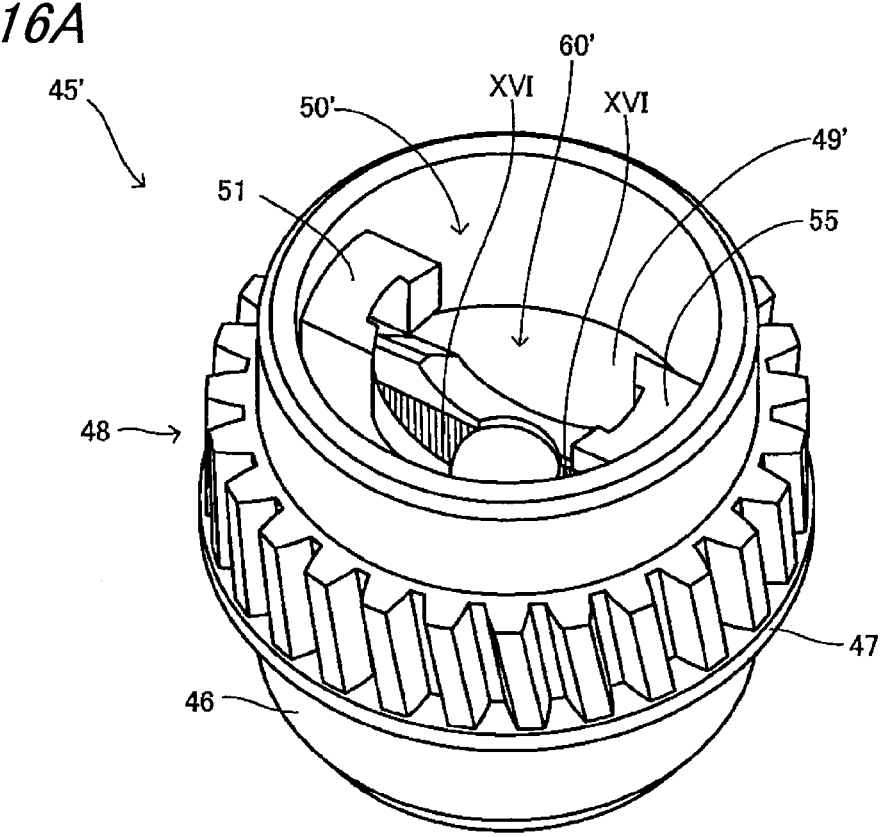
FIG. 16A is a drawing for explaining a second embodiment that is a perspective view of a bearing member.
Figure 16B:
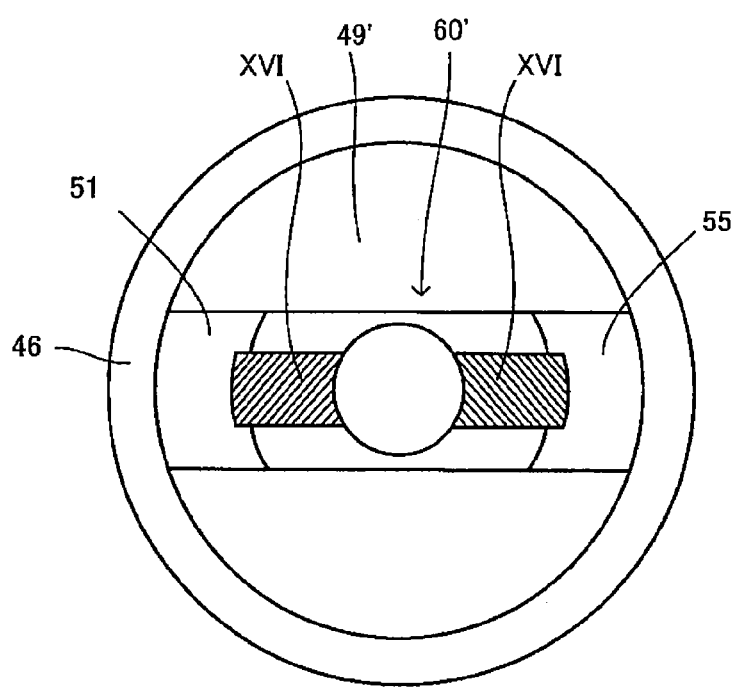
FIG. 16B is a plan view of the bearing member acquired by viewing the drawing sheet from above.

FIGS. 16A and 16B are drawings for explaining the second embodiment, showing a bearing member 45'. FIG. 16A is a perspective view, and FIG. 16B is a plan view of the bearing member 45' acquired when FIG. 16A is viewed in its axial direction. As hatched along with reference symbol XVI in FIGS. 16A and 16B, a portion of a pedestal 60' of a retaining portion 50' passes through the bottom 49' to the other side in the bearing member 45'.

The through area XVI serves as a cavity for use in injection molding, whereby the bearing member 45' can be efficiently produced by injection molding.

Figure 17:
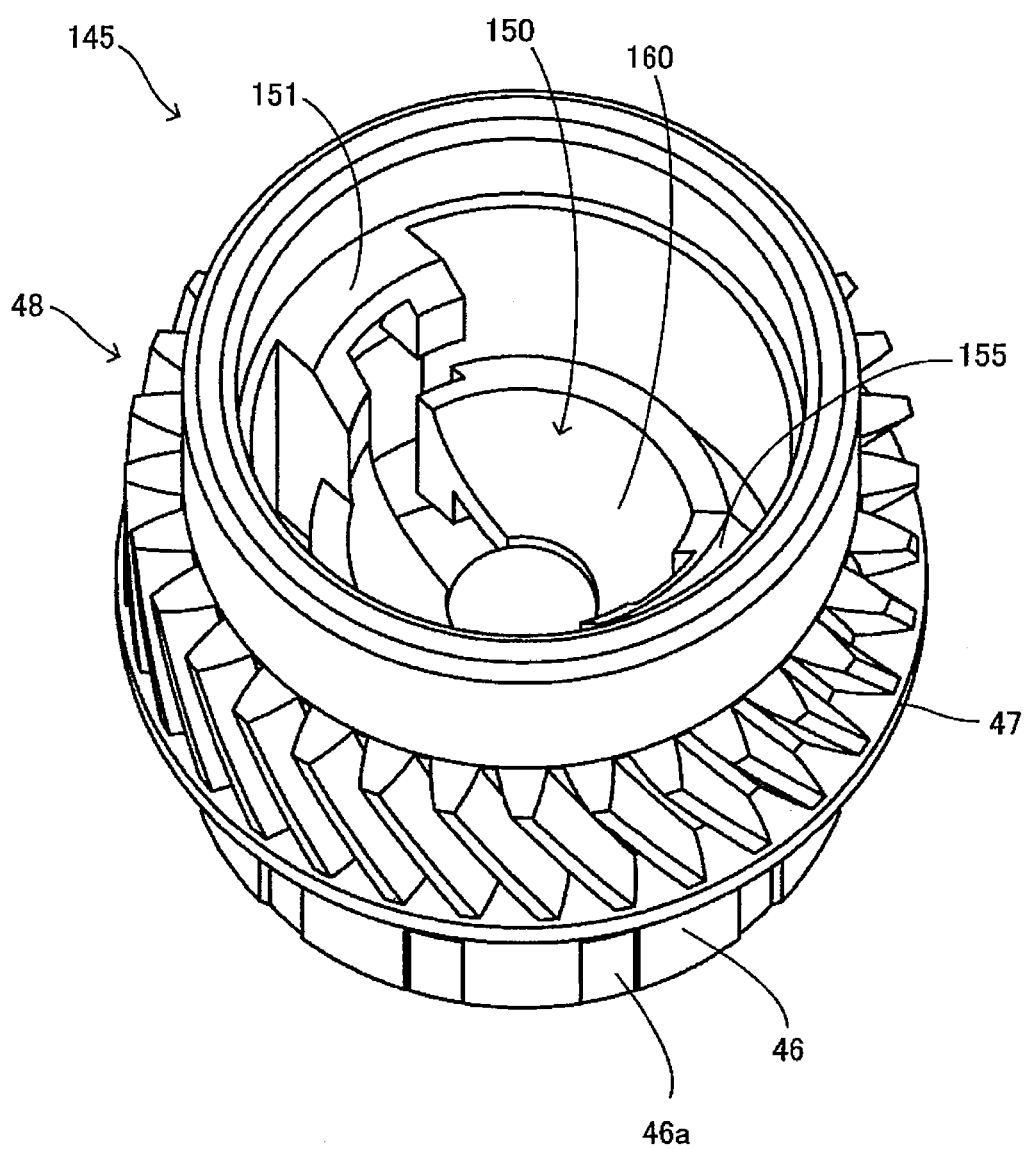
FIG. 17 is a drawing for explaining a third embodiment that is an external perspective view of a bearing member.
Figure 18:
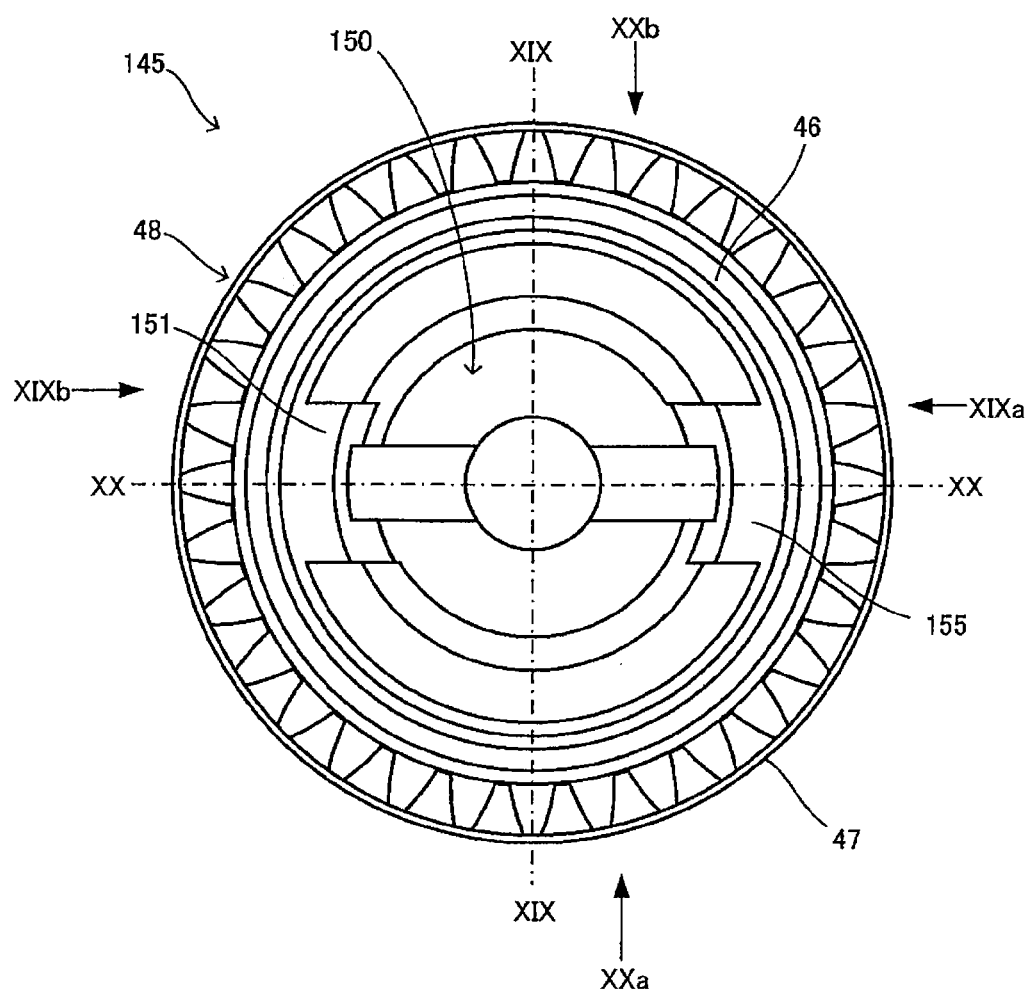
FIG. 18 is a drawing of the bearing member that is viewed from its axial direction.
Figure 19A:
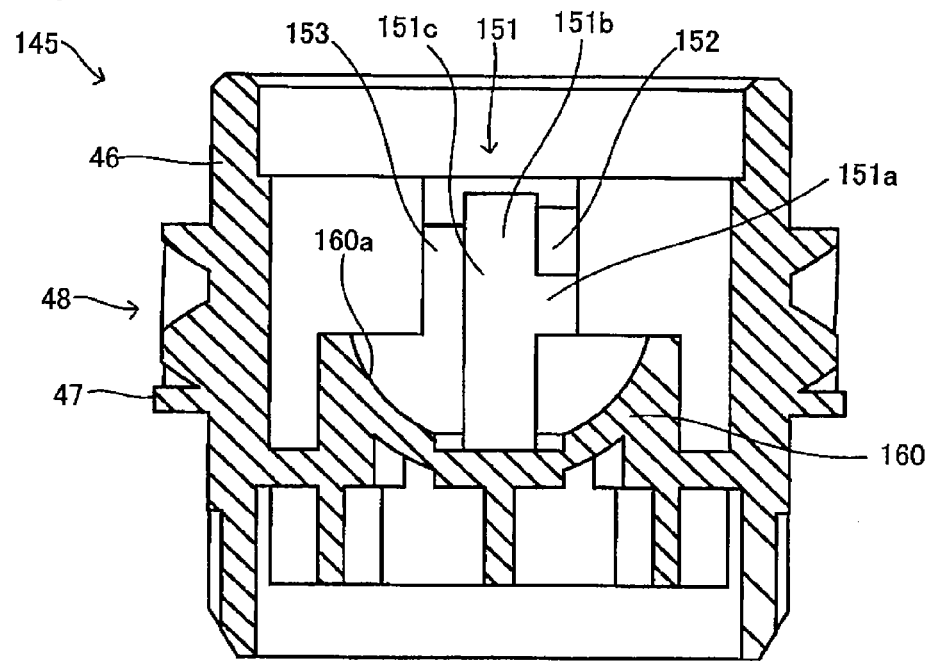
FIG. 19A is a drawing in which a cross section XIX-XIX shown in FIG. 18 is viewed in a direction of arrow XIXa.
Figure 19B:
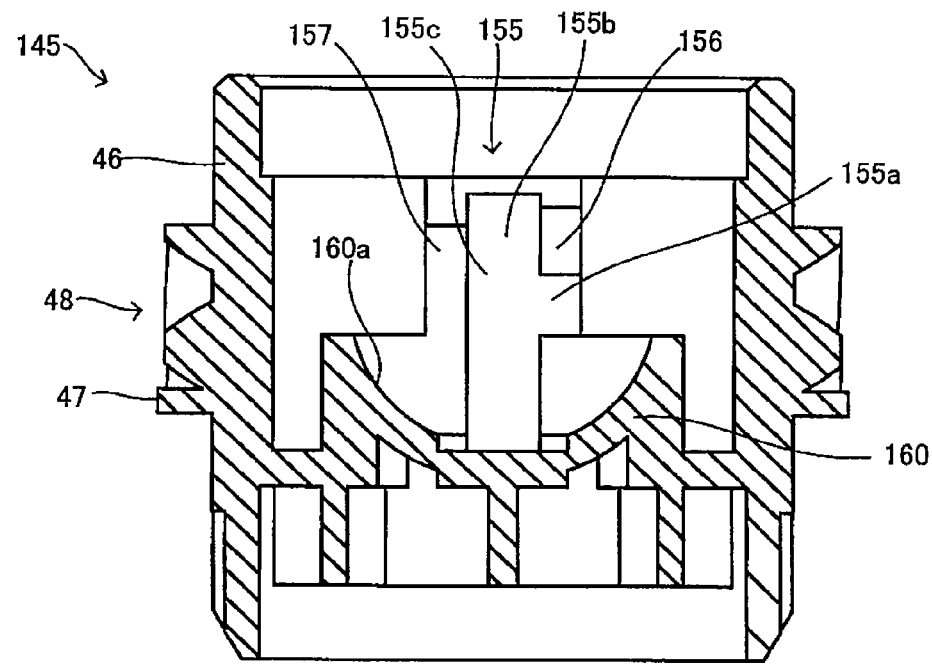
FIG. 19B is a drawing in which the cross section XIX-XIX shown in FIG. 18 is viewed in a direction of arrow XIXb.
Figure 20A:
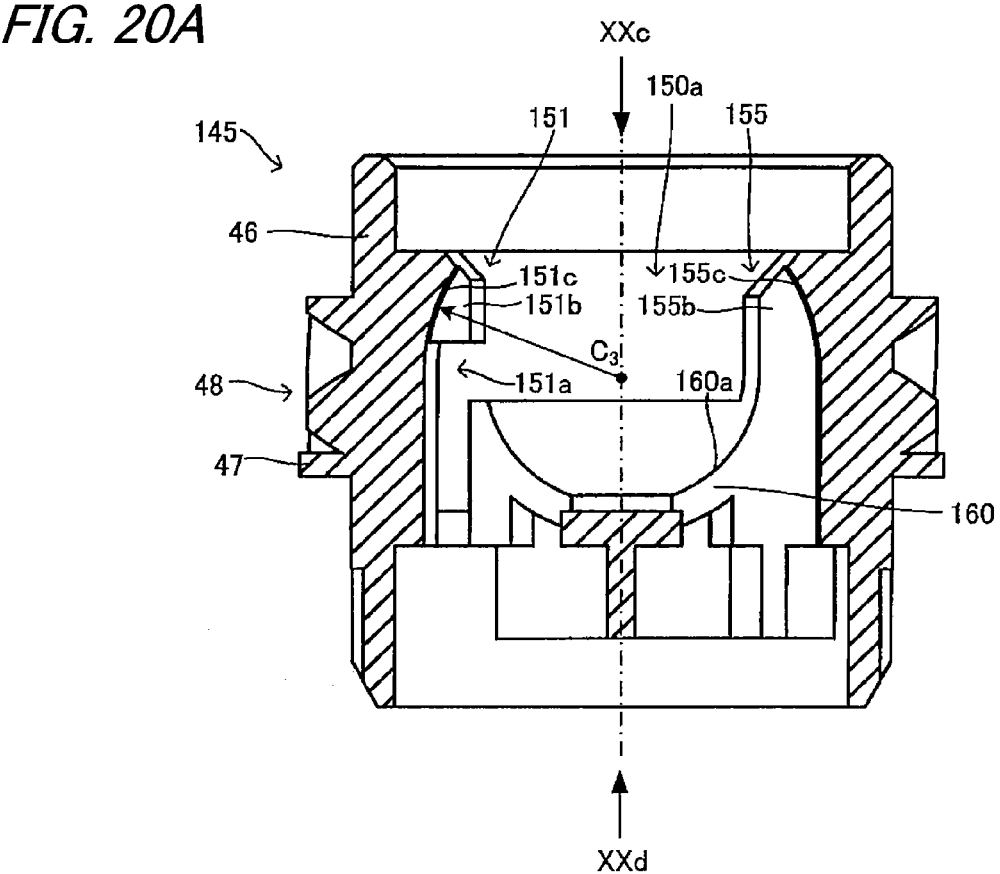
FIG. 20A is a drawing in which a cross section XX-XX shown in FIG. 18 is viewed in a direction of arrow XXa.
Figure 20B:
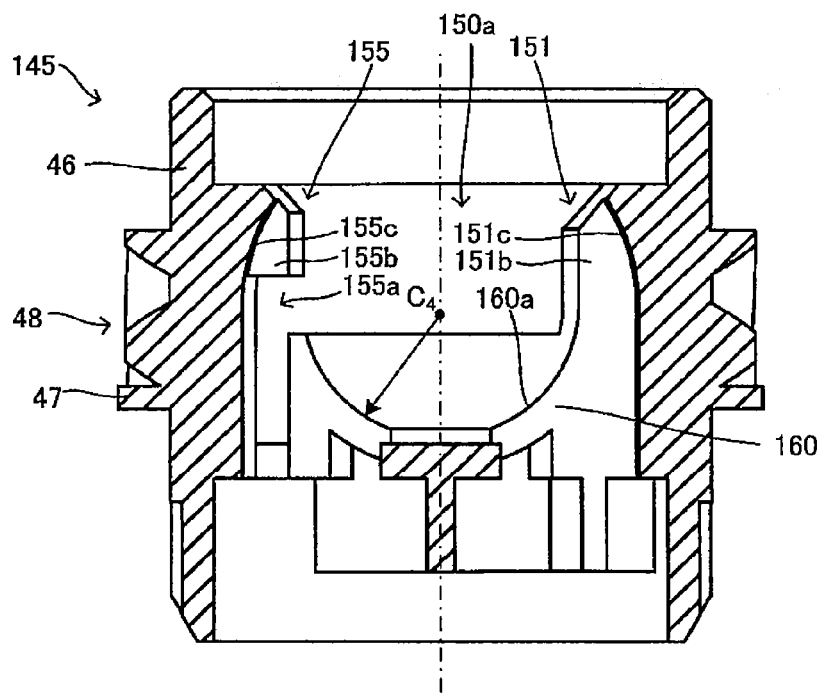
FIG. 20B is a drawing in which the cross section XX-XX shown in FIG. 18 is viewed in a direction of arrow XXb.

FIG. 17 is a drawing for explaining a third embodiment that is a perspective view of a bearing member 145 of the embodiment. FIG. 18 is a drawing of FIG. 17 that is viewed from an axial direction in which the shaft member 70 is inserted. FIG. 19A is a drawing in which a cross section XIX-XIX shown in FIG. 18 is viewed in a direction of arrow XIXa, and FIG. 19B is a drawing in which the cross section XIX-XIX shown in FIG. 18 is viewed in a direction of arrow XIXb. FIG. 20A is a drawing in which a cross section XX-XX shown in FIG. 18 is viewed in a direction of arrow XXa, and FIG. 20B is a drawing in which the cross section XX-XX shown in FIG. 18A is viewed in a direction of arrow XXb. In FIGS. 19A, 19B, 20A, and 20B, an end face (a cutting plane) in the cross section is denoted as being hatched.

Like the bearing member 45, the bearing member 145 has the cylindrical body 46, the contact wall 47, and the gear 48. As is well illustrated in FIG. 17, a plurality of recesses 46a are formed in an area to be applied with an adhesive on a portion of the cylindrical body 46 to be inserted into the photosensitive drum 35. The adhesive is thereby held in the recesses 46a, and adhesion between the photosensitive drum 35 and the bearing member 145 becomes much stronger.

A retaining portion 150 is formed at a cylindrical inside of the cylindrical body 46 in the embodiment. The retaining portion 150 is a region that retains the shaft member 70 in a swayable manner and has inside the cylindrical body 46 a first groove formation region 151 and a second groove formation region 155 that are areas used for forming inlet grooves 151a and 155a and swaying grooves 151b and 155b. The retaining portion 150 is interposed between one end of the first groove formation region 151 and one end of the second groove formation region 155. In the embodiment, a sphere receiving section 160 serving as a pedestal is provided so as to bridge the ends.

The first groove formation region 151 is a region used for forming the inlet groove 151a and the swaying groove 151b. As is seen from FIG. 17, FIG. 18, and FIG. 19A, the first groove formation region 151 has two block-shaped portions; namely, a first projection 152 and a second projection 153, such that the projections jut from an interior periphery of the cylindrical body 46. The first projection 152 and the second projection 153 each take a direction parallel to an axial direction of the cylindrical body 46 as a longitudinal direction and are spaced apart from each other at a predetermined spacing along a circumferential direction of the cylindrical body 46. The spacing serves as the swaying groove 151b. Accordingly, the swaying groove 151b is one that extends parallel to the axial direction of the cylindrical body 46.

Furthermore, as can be seen from FIG. 20A and FIG. 20B, the swaying groove 151b has a curved surface which exhibits a bow in such a way that spacing between bottom surfaces 151c and 155c of the mutually-opposed swaying grooves 151b and 155b becomes smaller at an open end of the swaying groove 151b by way of which the shaft member 70 is inserted (i.e., an upper side on the drawing sheet of FIGS. 20A and 20B). It is preferable in the embodiment that the curved surface be formed so as to assume a circular-arc cross sectional profile shown in FIGS. 20A and 20B. It is preferable that a center C3 of the circular arc should lie on the axis line of the cylindrical body 46 as shown in FIG. 20A.

The swaying groove 151b of the embodiment is formed such that no undercut exists when viewed from the other side of the open end along an axial direction as designated by arrow XXd in FIG. 20A. The expression "no undercut" means that, in relation to a section line shown in an arbitrary cross section that is orthogonal to the axial direction of the swaying groove 151b, the section line distant with respect to the arrow XXd becomes more equidistant to the shaft side or the shaft when compared with the section line close to the arrow XXd. Absence of an undercut on the swaying groove 151b is not always required in the invention. However, this allows easy integral molding of the swaying groove as will be described later.

As is seen from FIG. 19A, the first projection 152 is provided with the inlet groove 151a that establishes mutual communication between one side and the other side and that is formed by cutting the first projection 152 along the circumferential direction of the cylindrical body 46. Accordingly, a groove for establishing a mutual communication from the swaying groove 151b to the other side of the first projection 152 (the outside of the retaining portion 150) with the first projection 152 sandwiched therebetween is formed from the inlet groove 151a. As is seen from FIG. 20A, one side of a wall surface that makes up the inlet groove 151a is made up of an end face of the sphere receiving section 160.

The second groove formation region 155 is a region where the inlet groove 155a and the swaying groove 155b are to be formed. As can be seen from FIG. 18 and FIG. 19B, the second groove formation region 155 has two block-shaped portions, or a first projection 156 and a second projection 157, so as to jut out from the interior periphery of the cylindrical body 46. The first projection 156 and the second projection 157 take each a direction parallel to the axial direction of the cylindrical body 46 as a longitudinal direction and spaced apart from each other at a given spacing along the circumferential direction of the cylindrical body 46. The spacing serves as the swaying groove 155b. Accordingly, the swaying groove 155b is one that extends parallel to the axial direction of the cylindrical body 46.

Furthermore, as can be seen from FIG. 20A and FIG. 20B, the swaying groove 155b has a curved surface which exhibits a bow in such a way that spacing between the bottom surfaces 151c and 155c of the mutually-opposed swaying grooves 151b and 155b becomes smaller at the open end of the swaying groove 155b by way of which the shaft member 70 is inserted (i.e., the upper side on the drawing sheet of FIGS. 20A and 20B). It is preferable that the curved surface should be formed so as to assume a circular-arc cross sectional profile shown in FIG. 20A and FIG. 20B. It is more preferable that the circular arc of the bottom surface 155c belongs to the same circle as that that includes the circular arc of the bottom surface 151c of the swaying groove 151b and that the center of the circular arc also lie in the center C3.

The swaying groove 155b of the embodiment is formed such that no undercut exists when viewed from the other side of the open end and from the front along the axial direction as designated by arrow XXd in FIG. 20A. Although absence of the undercut is not necessarily required in the invention, integral molding of the swaying groove can thereby be performed easily as will be described later.

As is seen from FIG. 19B, the first projection 156 is provided with the inlet groove 155a that establishes mutual communication between one side and the other side and that is formed by cutting the first projection 156 along the circumferential direction of the cylindrical body 46. Accordingly, a groove for establishing a mutual communication from the swaying groove 155b to the other side of the first projection 156 (the outside of the retaining portion 150) with the first projection 156 sandwiched therebetween is formed from the inlet groove 155a. As is seen from FIG. 20B, one side of a wall surface that makes up the inlet groove 155a is made up of the end face of the sphere receiving section 160.

The sphere receiving section 160 acts as a pedestal; is interposed between one end of the first groove formation region 151 and one end of the second groove formation region 155; and corresponds to a container-shaped region formed in the cylindrical body 46. As is seen from FIGS. 19A and 19B, the sphere receiving section 160 has a bottom 160a.

The bottom 160a is a region that makes up a bottom of the container-shaped sphere receiving section 160. In the embodiment, the bottom 160a has a curved surface that exhibits a bow so as to make up a portion of a spherical surface. It is preferable as is seen from FIG. 17, FIGS. 19A and 19B, and FIGS. 20A and 20B that the curved surface be a portion of the spherical surface. The sphere receiving section 160 can thereby restrict the sphere 90 of the shaft member 70 in directions other than the direction in which the sphere becomes dislodged along the axial direction. It is further preferable that a center C4 of the spherical surface should lie on the shaft line of the cylindrical body 46 as shown in FIG. 20B.

It is more preferable that a radius of the spherical surface is set so as to become substantially equal to a radius of the sphere 90 of the shaft member 70.

As above, a concave portion 150a is formed as a result of being enclosed by the first groove formation region 151, the second groove formation region 155, and the sphere receiving section 160. A bottom (i.e., the bottom 160a) of the concave portion 150a assumes a spherically curved concave shape. In the meantime, an area of the concave portion 150a opposite to the bottom 160a is opened. The concave portion 150a serves as a space for receiving the sphere 90 of the shaft member 70.

An open-side end face of the sphere receiving section 160 makes up one sidewall surface of the inlet groove 151a and one sidewall surface of the inlet groove 155a as above.

The sphere receiving section 160 is formed such that no undercut exists when viewed from the open side of a concave portion 160b along an axial direction as designated by arrow XXc in FIG. 20A. The expression "no undercut" means that, in connection with an arbitrary adjacent cross section orthogonal to an axial direction of the sphere receiving section 160, a point on the cross section facing the bottom 160a of the concave portion 160b when viewed from arrow XXc becomes more equidistant from the axis side or the axis when compared with the open side of the concave portion 160b.

As is seen from FIGS. 20A and 20B, spacing exists between an exterior periphery of the sphere receiving section 160 and the interior periphery of the cylindrical body 46 in the embodiment.

Figure 21:
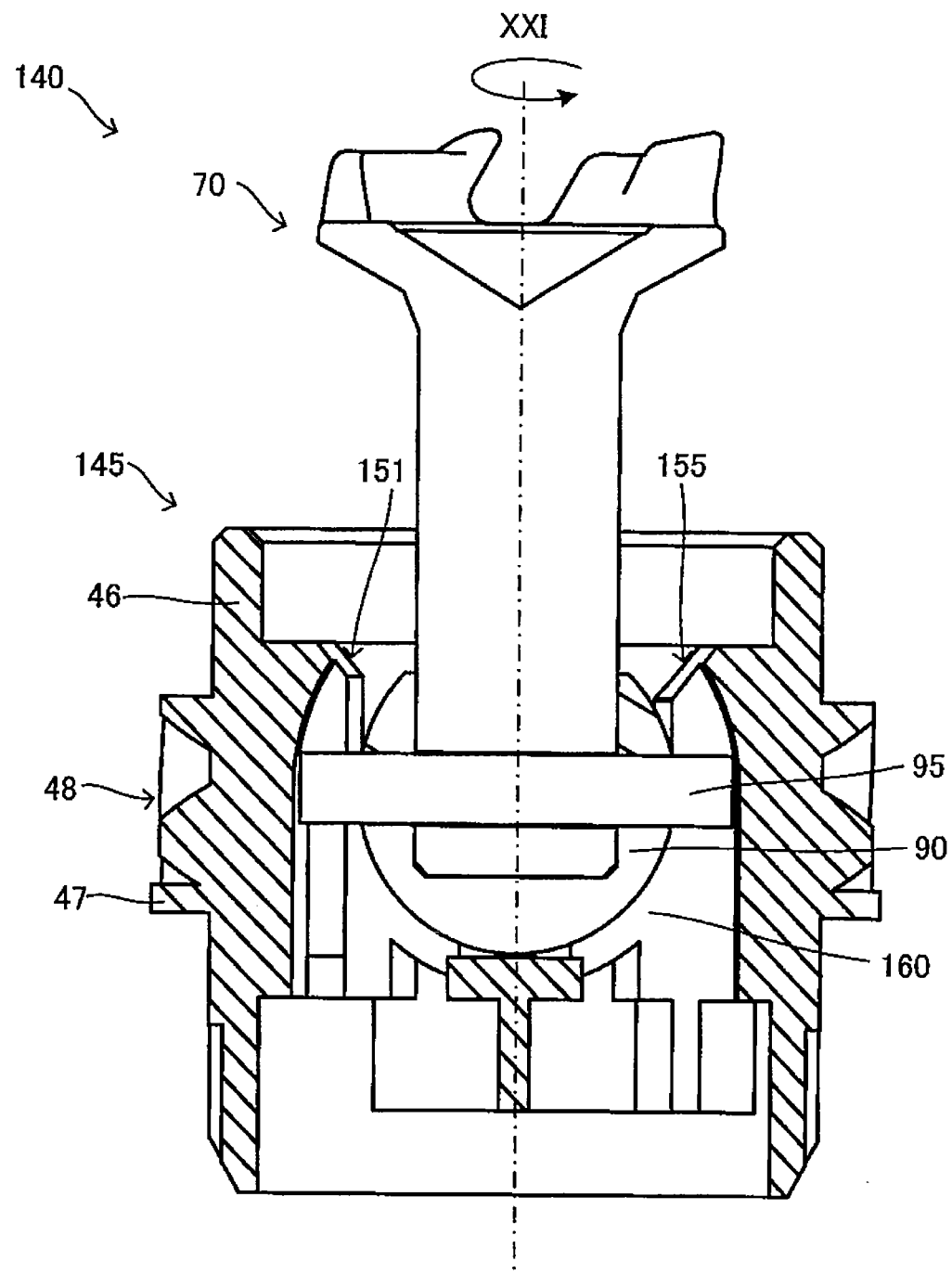
FIG. 21 is a drawing showing an attitude of the bearing member outfitted with the shaft member in connection with the cross sectional view of FIG. 20A.
Figure 22:
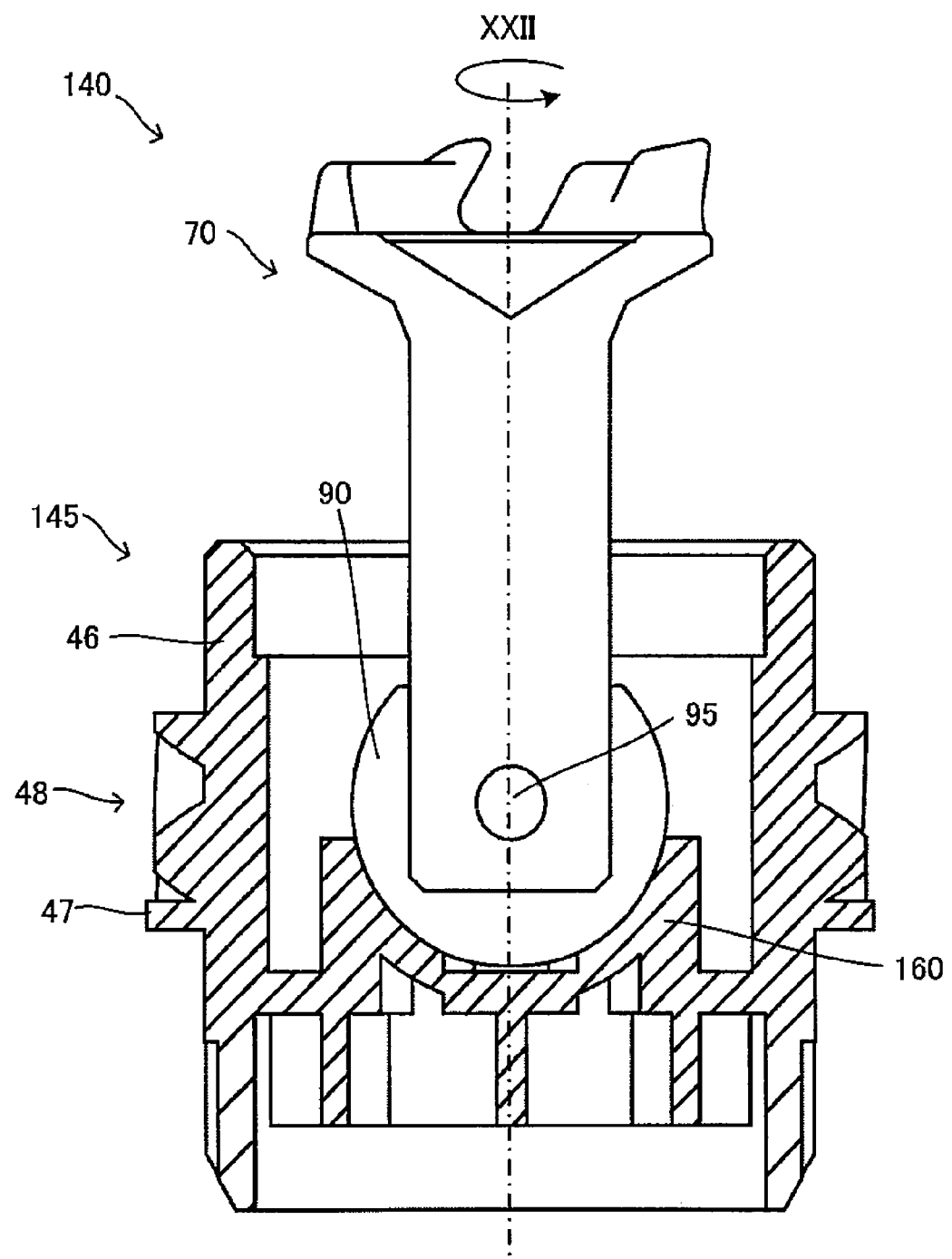
FIG. 22 is a drawing showing an attitude of the bearing member outfitted with the shaft member in connection with the cross sectional view of FIG. 19A.
Figure 23A:
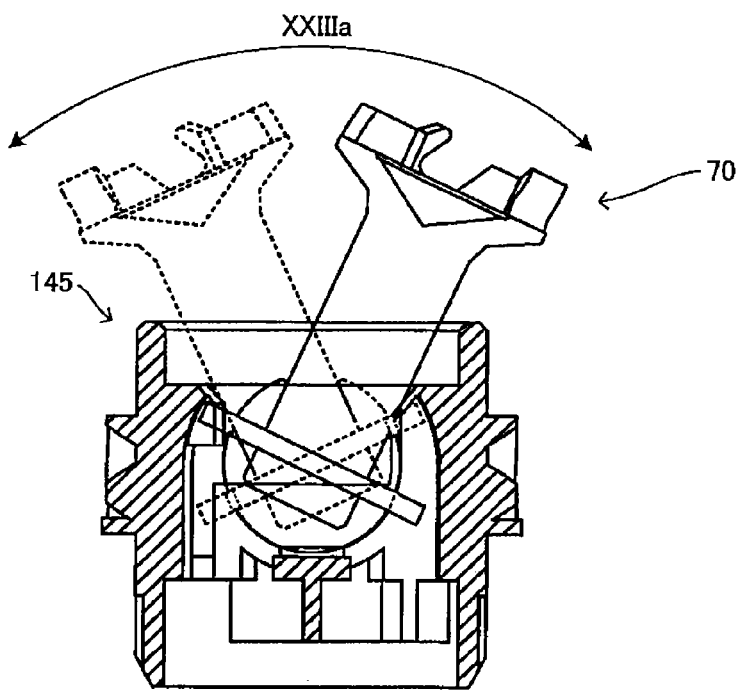
FIG. 23A is a drawing showing an attitude of the shaft member most inclined to one side when viewed from the same viewpoint as that in FIG. 21.
Figure 23B:
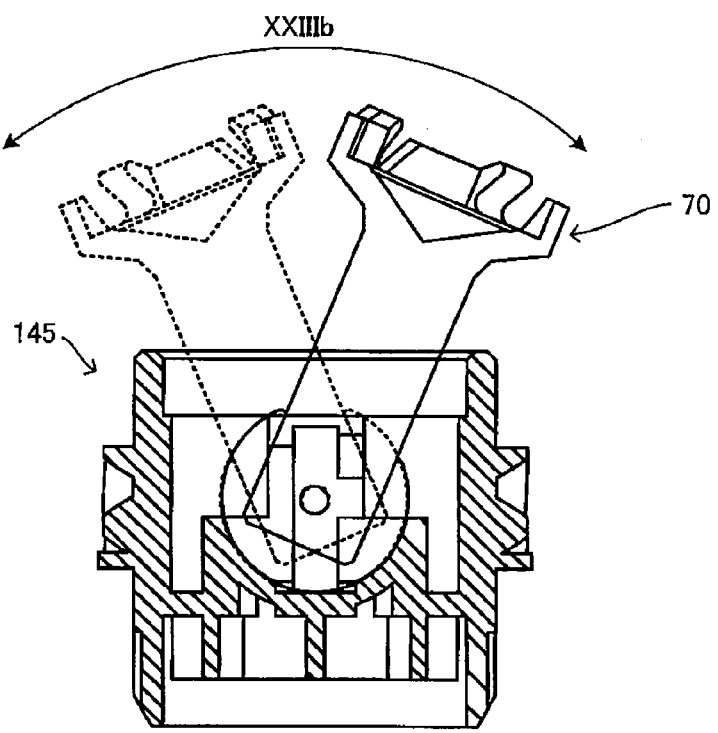
FIG. 23B is a drawing showing an attitude of the shaft member most inclined to the other side when viewed from the same viewpoint as that in FIG. 22.

An end member 140 is formed as a result of the shaft member 70 being attached to the bearing member 145 as follows. FIG. 21 is a cross sectional view corresponding to FIG. 8, and FIG. 22 is a cross sectional view acquired from a viewpoint that is turned 90 degrees around the axis from the viewpoint shown in FIG. 21. FIGS. 23A and 23B show an inclined attitude of the shaft member 70. FIG. 23A shows swaying motion of the shaft member 70 in the cross section illustrated in FIG. 21, and FIG. 23B shows swaying motion of the shaft member 70 in the cross section illustrated in FIG. 22.

As is seen from FIGS. 21 and 22, the sphere 90 of the shaft member 70 is disposed in the concave portion 160b of the retaining portion 150. Both ends of the torque transmission pin 95 jutting out of the sphere 90 are situated in the two swaying grooves 151b and 155b, respectively. The shaft member 70 is thereby attached to and retained by the bearing member 145. Specifically, a radius of a spherical shape of the bottom 160a that makes up the concave portion 160b is set substantially equal to the radius of the sphere 90. Smooth, wobble-free swaying motion thereby becomes feasible. Further, the swaying grooves 151b and 155b are formed such that a width of each of the grooves becomes slightly larger than the diameter of the torque transmission pin 95 and that there is a region where spacing between the bottoms 151c and 155c of the mutually-opposed two swaying grooves 151b and 155b becomes larger than the length of the torque transmission pin 95.

The shaft member 70 is placed at and attached to the inside of the bearing member 145 as above, whereby the shaft member 70 can make turns (swaying action) in a direction in which the axis line of the torque transmission pin 95 sways by itself as designated by reference symbol XXIIIa in FIG. 23A. This can be realized by means of both ends of the torque transmission pin 95 moving in the respective swaying grooves 151b and 155b along their longitudinal direction.

Moreover, as designated by reference symbol XXIIIb in FIG. 23B, the shaft member 70 can make turns (swaying action) around the axis line of the torque transmission pin 95. Specifically, the shaft member 70 can make turns (swaying action) around the axis line of the torque transmission pin 95 in a direction orthogonal to the direction shown in FIG. 23A.

Upon receipt of drive force from the main body 10, the shaft member 70 experiences torque centered on the axis line as designated by reference symbol XXI in FIG. 21 and reference symbol XXII in FIG. 22. The coupling member 71 experiences rotational drive force from the main body 10 at this time, and the sphere 90 and the torque transmission pin 95 rotate while keeping up with the coupling member 71. Both ends of the torque transmission pin 95 get snagged on the groove side surfaces (groove sidewalls) of the swaying grooves 151b and 155b, thereby transmitting the torque to the bearing member 145 and further to the photosensitive drum 35. A direction of rotation achieved at that time is set such that the torque transmission pin 95 becomes opposite to the inlet grooves 151a and 155a (i.e., oriented toward an upstream side with respect to the direction of rotation). The shaft member 70 can thereby be prevented from becoming dislodged from the bearing member 145, which would otherwise be caused by rotation.

Figure 24:
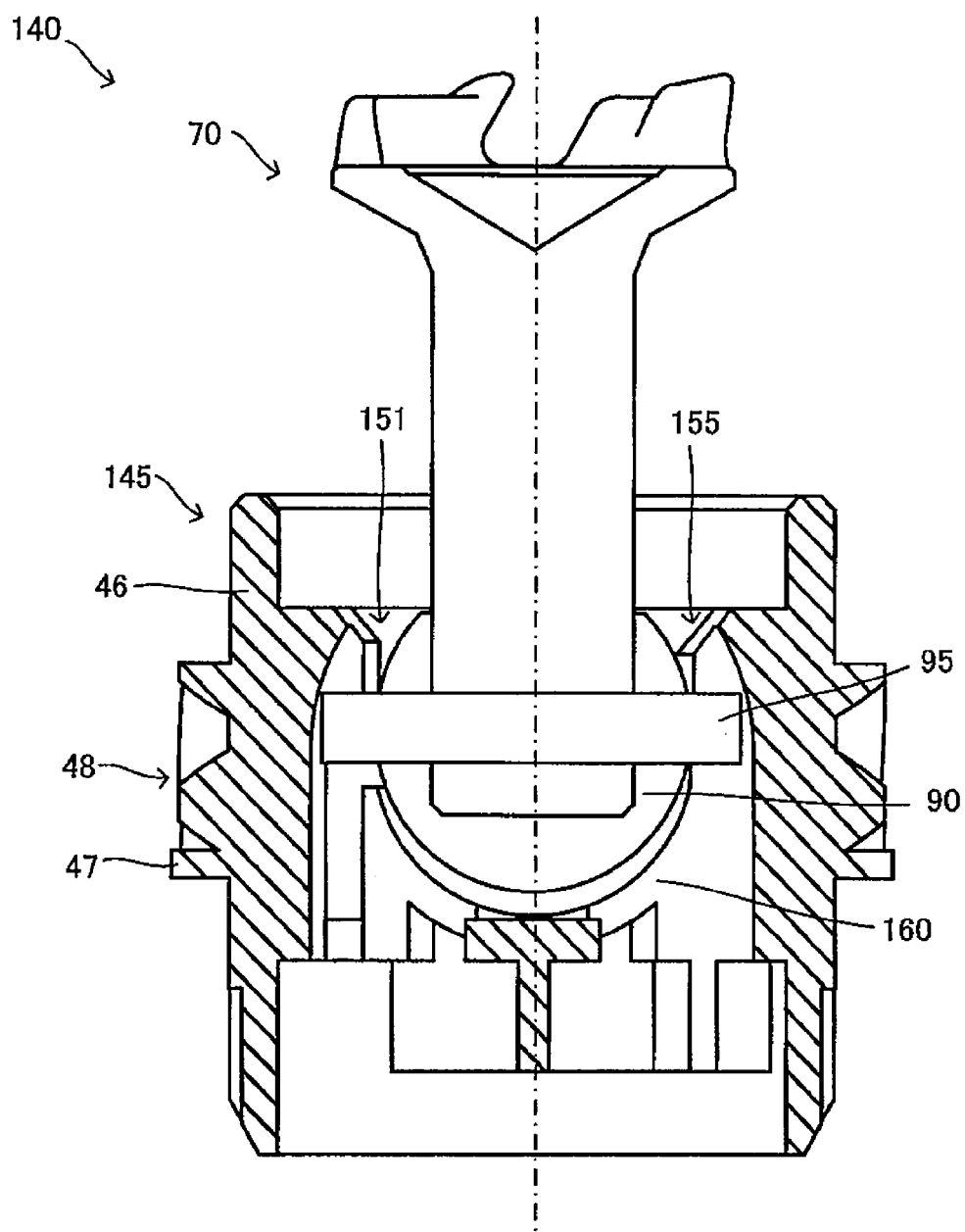
FIG. 24 is a drawing showing a state of the shaft member and the bearing member acquired in a scene where the shaft member is pulled in the axial direction.

FIG. 24 is a drawing showing an attitude of the shaft member 70 and an attitude of the bearing member 145 acquired in a scene where the shaft member 70 is pulled in the axial direction. As above, the respective ends of the swaying grooves 151b and 155b are curved in a circular-arc shape, and narrow spacing exists between the bottoms 151c and 155c of the mutually-opposed swaying grooves 151b and 155b. The torque transmission pin 95 is made longer than the distance between the thus-narrowly-spaced bottoms 151c and 155c of the swaying grooves 151b and 155b. Even if the shaft member 70 is pulled in the axial direction, the torque transmission pin 95 thereby becomes snagged on the swaying grooves 151b and 155b as shown in FIG. 24, so that the shaft member 70 will not become dislodged from the bearing member 145. As is obvious from the above, axial movements of the shaft member 70 are restricted by the torque transmission pin 95 and the swaying grooves 151b and 155b.

Further, in relation to the restrictions on such axial movements, it is preferable to impose restrictions so as to prevent axial movements of the shaft member 70 in addition to preventing the shaft member 70 from becoming dislodged from the bearing member 145 in the axial direction. When the shaft member 70 is attached to the bearing member 145, occurrence of rattling is thereby prevented, and swaying of the shaft member 70 and attachment/detachment of the process cartridge 20 to/from the main body 10 also become smoother.

In this regard, the following configurations; for instance, are available. Specifically, as shown in FIG. 21, the requirement is that the sphere 90 should be placed in contact with the curved surface of the pedestal 160 and that a match should exist, in a swayable state, between the center position of the sphere 90 and the center position of the axis line of the pin 95 achieved in a state where the shaft member 70 is pulled in the axial direction as shown in FIG. 24. The shaft member 70 is thereby substantially prevented from moving in the axial direction, so that occurrence of rattling can be prevented as above.

It is preferable that a position of the center C3 (see FIG. 20A) of the curved surfaces of the bottom surfaces 151c and 155c of the swaying grooves 151b and 155b and a position of the center C4 of the curved surface of the sphere receiving section 160 should be determined from the above viewpoint and that both positions should be substantially equal to each other.

When the curved surfaces of the bottom surfaces 151c and 155c of the swaying grooves 151b and 155b each assume the circular-arc cross sectional profiles shown in FIGS. 20A and 20B and make up the portion of the spherical surface of the sphere receiving section 160, it is preferable that the center position C3 of the circular arc should be substantially identical with the center position C4 of the spherical surface.

Figure 25:
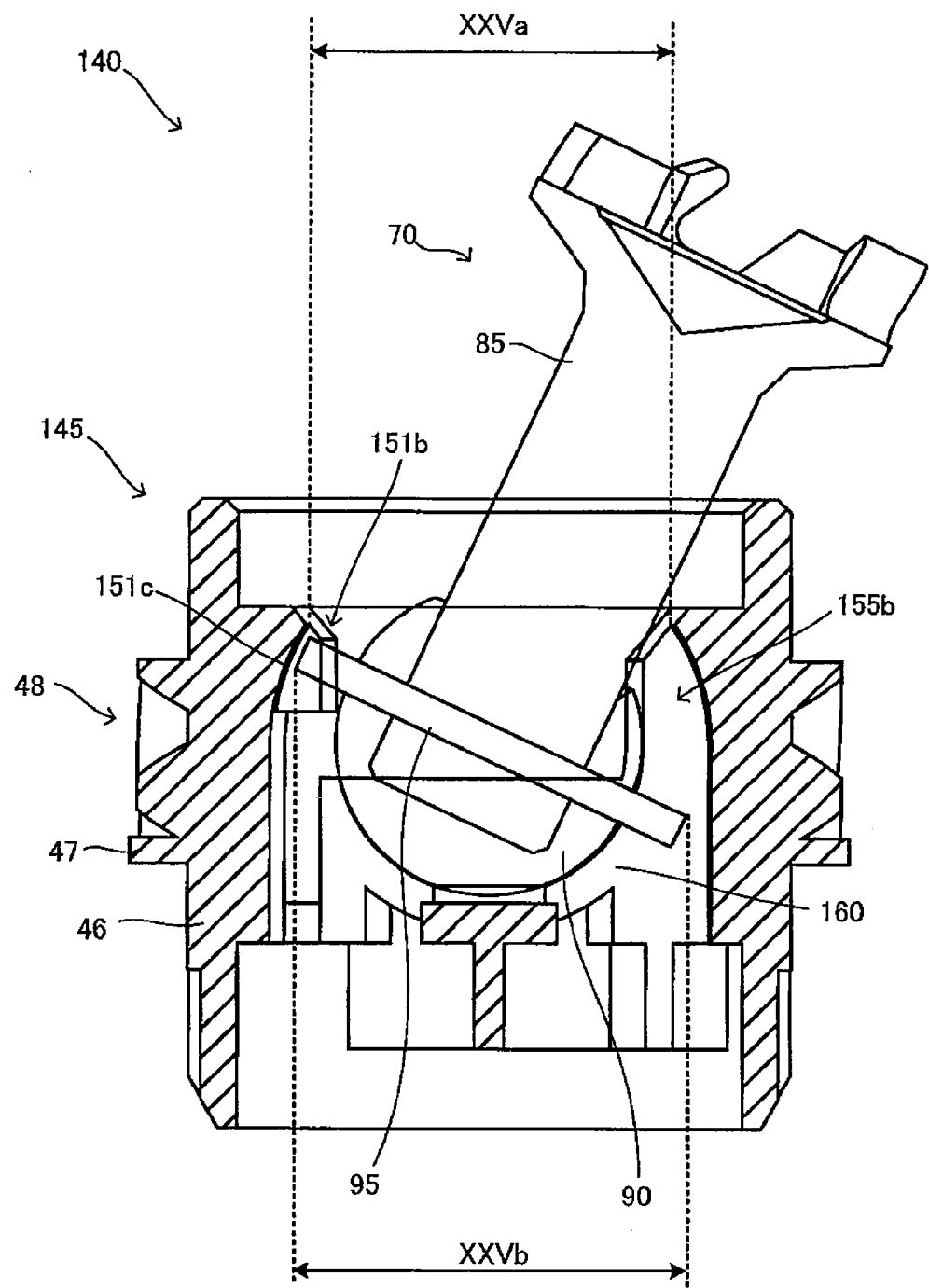
FIG. 25 is a drawing for explaining an attitude of the shaft member when most inclined.

FIG. 25 shows the attitude of the most inclined shaft member 70 in the cross section shown in FIG. 21; in other words, the attitude of the shaft member 70 that is most inclined by the torque transmission pin 95 around its longitudinal center. Accordingly, the shaft member 70 is inclined such that one end of the torque transmission pin 95 has come to a narrow region of the swaying groove 151b and that the other end of the same is separated from the region.

A distance designated by reference symbol XXVa in FIG. 25 represents at this time a distance of the narrowest spacing between the bottoms of the swaying grooves 151b and 155b. Further, a distance designated by reference symbol XXVb in FIG. 25 represents a distance between the ends of the torque transmission pin 95 in the radial direction of the cylindrical body 46 at the attitude of the shaft member 70 shown in FIG. 25. In the embodiment, the distance XXVb is made longer than the distance XXVa. By means of this, even when the shaft member 70 has inclined most, the torque transmission pin 95 gets snagged on the swaying grooves 151b and 155b without fail, there is at least little chance of the shaft member 70 becoming dislodged from the bearing member 145 under its own weight or pretty external force. Accordingly, the shaft member 70 can be reliably retained on the bearing member 145, and the shaft member 70 will not become dislodged from the bearing member 145 in an unwanted scene, so that the shaft member and the bearing member can act as the end member 140.

Attaching the shaft member 70 to the bearing member 145 can be performed by use of the inlet grooves 151a and 155a, and an attachment method is analogous to that described in connection with the end member 40.

The bearing member 145 and the shaft member 70 that make up the end member 140 can also be formed by a combination of plurality of parts or by means of molding parts into one unit as will be described later. In the case of a configuration involving a combination of a plurality of parts, the parts can also be made of a single material or heterogeneous materials. Known means, such as an adhesive, ultrasonic waves, heat sealing, screwing, bolting, and the like, can be applied for bonding the parts.

A method for manufacturing the bearing member 145 will now be described. An example for manufacturing the bearing member 145 in one piece is now described as an example of a preferred mode. The bearing member 145 of the embodiment is formed by injection molding for reasons of absence of undercuts on the concave portion and the swaying grooves, as described by reference to the foregoing embodiment. Specifically, a plurality of molding dies are combined, and a void in the thus-combined die assembly is filled with a material that exhibits fluidity by means of injection. The material is then solidified and released from the die assembly, whereby a bearing member is molded. Accordingly, molding the bearing member 145 involves use of a molding die for forming an exterior periphery of the cylindrical portion 46 and another molding die for forming an interior shape of the cylindrical portion 46. Molding the interior of the bearing member is now described. The shape of the exterior periphery (for instance, the gear 48) of the cylindrical portion 46 can be molded by means of a known method.

Figure 26A:
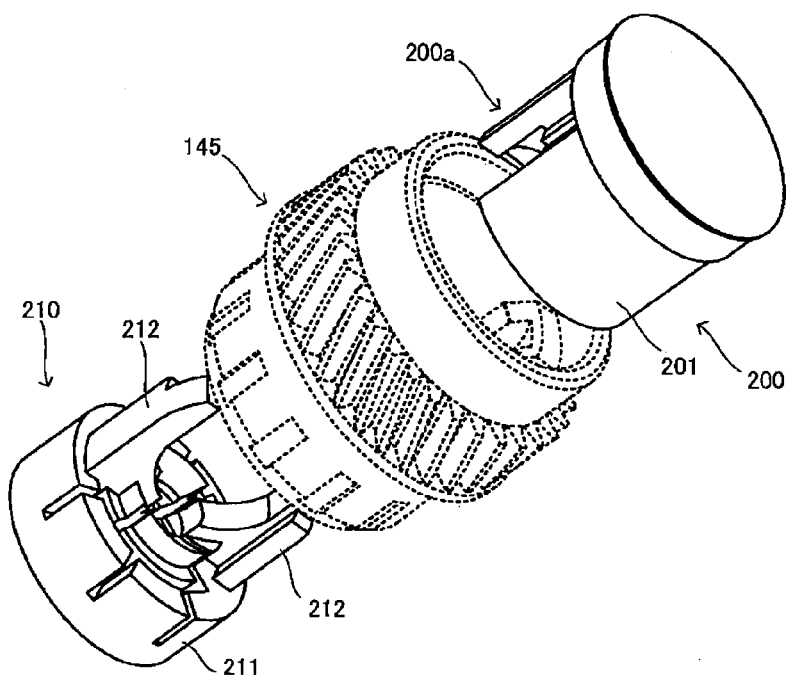
FIG. 26A is a perspective view showing a die assembly for manufacturing the bearing member.
Figure 26B:
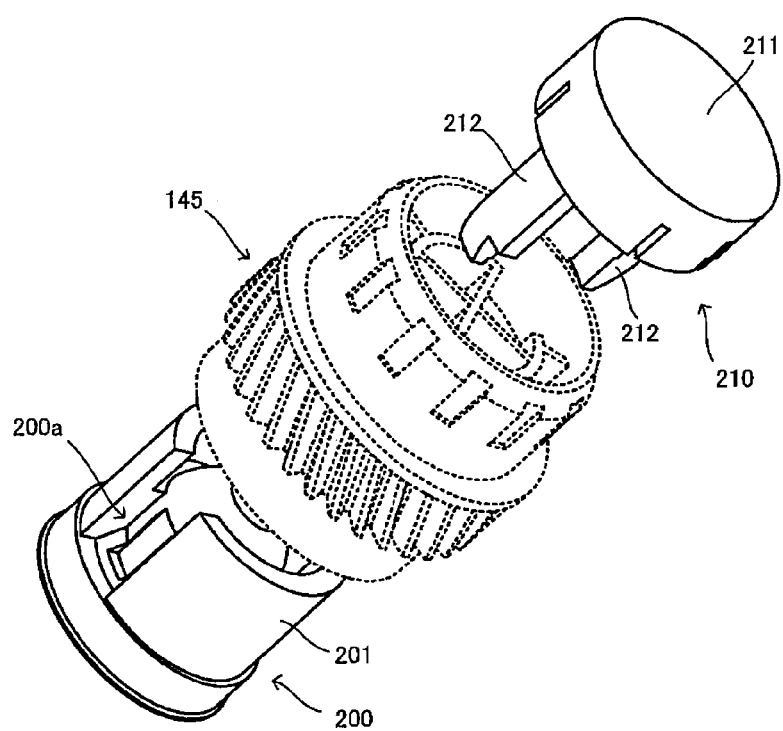
FIG. 26B is a perspective view obtained when
Figure 27:
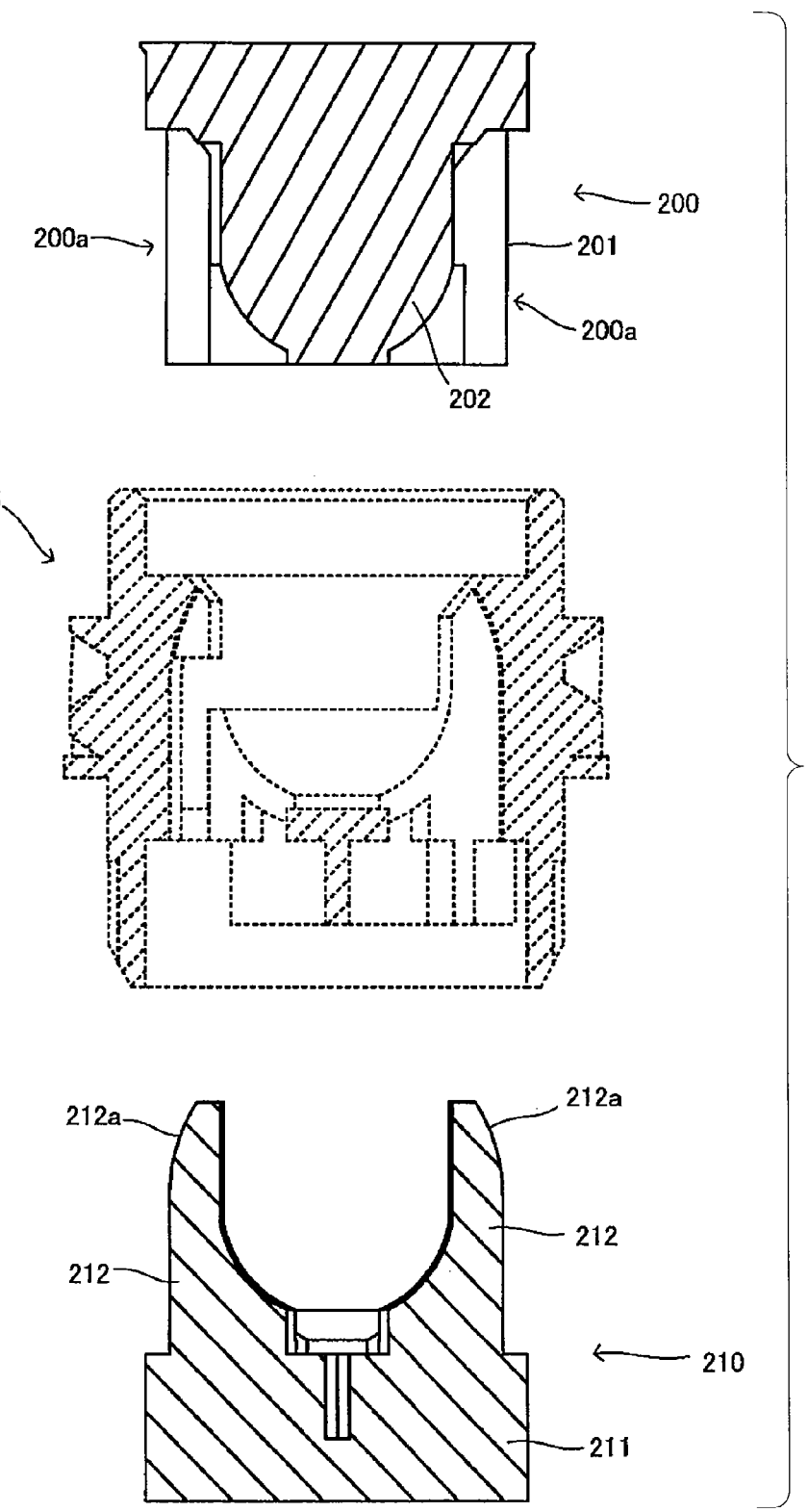
FIG. 27 is a cross sectional view of a first molding die and a second molding die.
Figure 28:
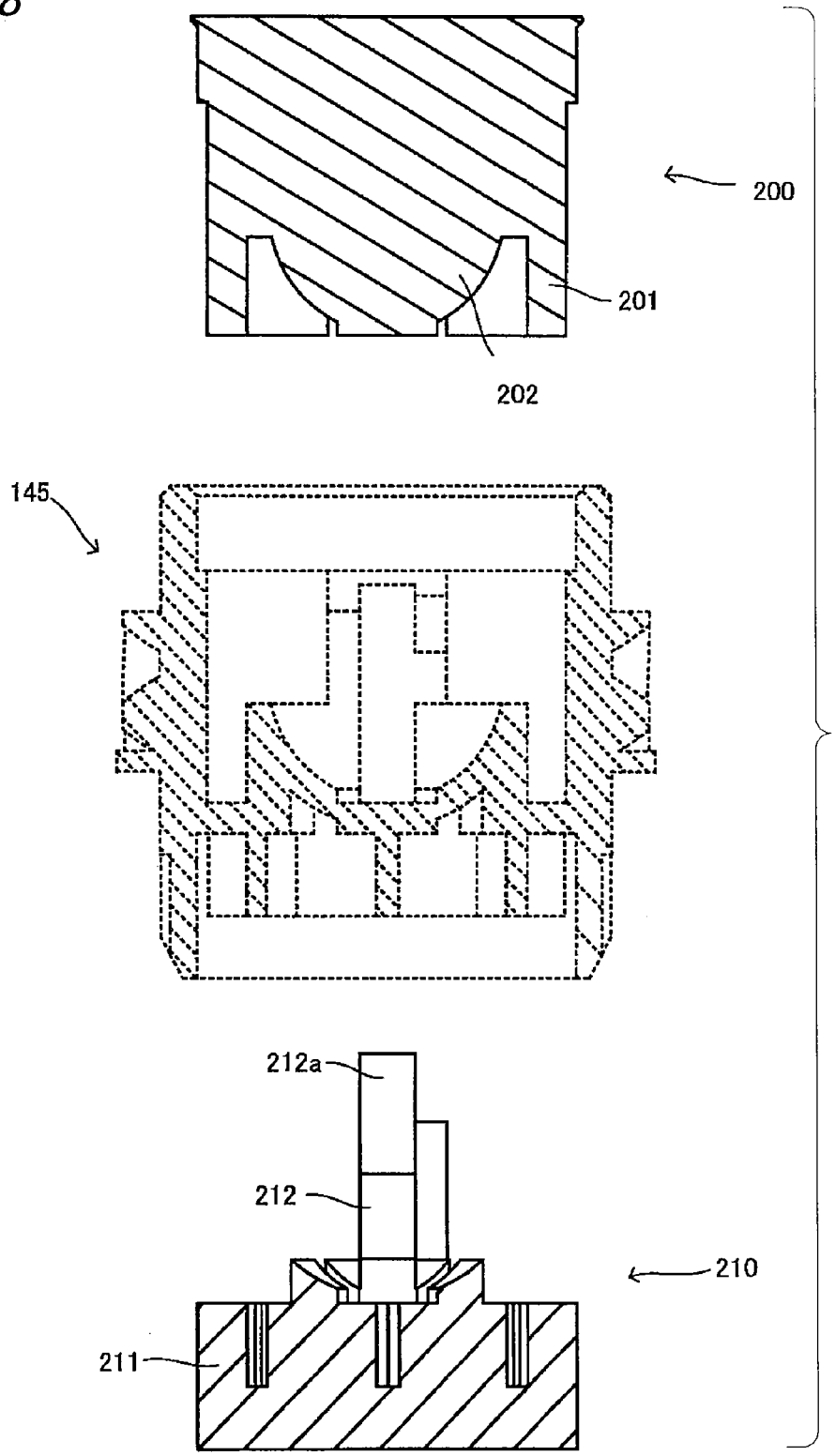
FIG. 28 is another cross sectional view of the first molding die and the second molding die.

FIGS. 26A and 26B provide perspective views of a first molding die 200 and a second molding die 210 that mold an interior shape of the bearing member 145. FIG. 26A shows the first molding die 200 top right and the second molding die 210 bottom left, whilst FIG. 26B shows the second molding die 210 top right and the first molding die 200 bottom left. FIGS. 26A and 26B show the first and second molding dies along with the bearing member 145 to be molded by broken lines. FIG. 27 shows a cross sectional view of the first molding die 200, a cross sectional view of the second molding die 210, and a cross sectional view of the bearing member 145 that are taken along one axial direction, and FIG. 28 shows cross sectional views taken along the axial direction that is shifted 90 degrees in the axial direction with respect to the cross sections shown in FIG. 27.

As is seen from FIGS. 26A and 26B, FIG. 27, and FIG. 28, the interior shape of the bearing member 145 is molded by means of the two molding dies; namely, the first molding die 200 and the second molding die 210.

The first molding die 200 has a cylindrical portion 201 and a concave formation portion 202. A cylindrical area of the cylindrical portion 201 assumes a shape used for making spacing between a cylindrical interior surface of the bearing member 145 and an outer periphery of the sphere receiving section 160. In the meantime, as seen from FIG. 28, the concave formation portion 202 is provided in the form of a dome within the cylindrical portion 201. The concave formation portion 202 assumes a shape that enables formation of the sphere receiving section 160.

Grooves 200a into which swaying groove molding portions 212 of the second molding die 210 are to be inserted are formed in an outer periphery of the first molding die 200. Each of the grooves 200a has a depth to a position at which the swaying grooves 151b and 155b are formed.

Meanwhile, the second molding die 210 is a molding die for forming the swaying grooves 151b and 155b, and the two swaying groove molding portions 212 stand upright on a disc-shaped base 211 so as to oppose each other. Accordingly, the swaying groove molding portions 212 of the second molding die 210 each have substantially the same thickness as that of each of the swaying grooves 151b and 155b. As is seen from FIG. 27, curved portions 212a for making curved portions of the swaying grooves 151b and 155b are formed on exterior surfaces of the respective swaying groove molding portions 212.

Figure 29A:
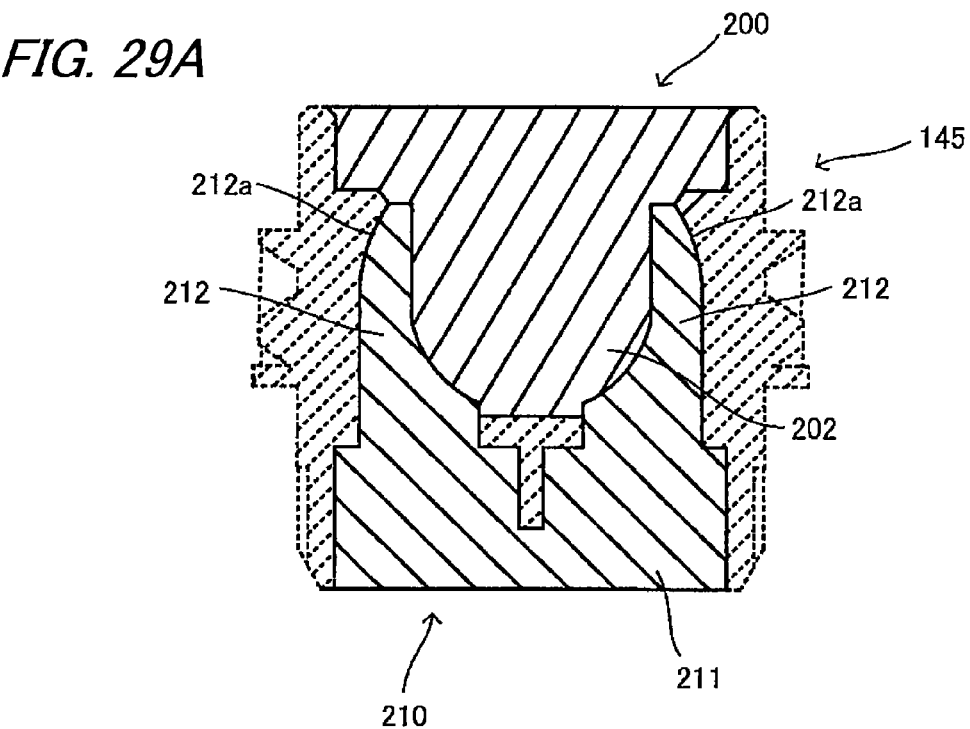
FIG. 29A is a cross sectional view achieved when the first molding die and the second molding die are combined together.
Figure 29B:
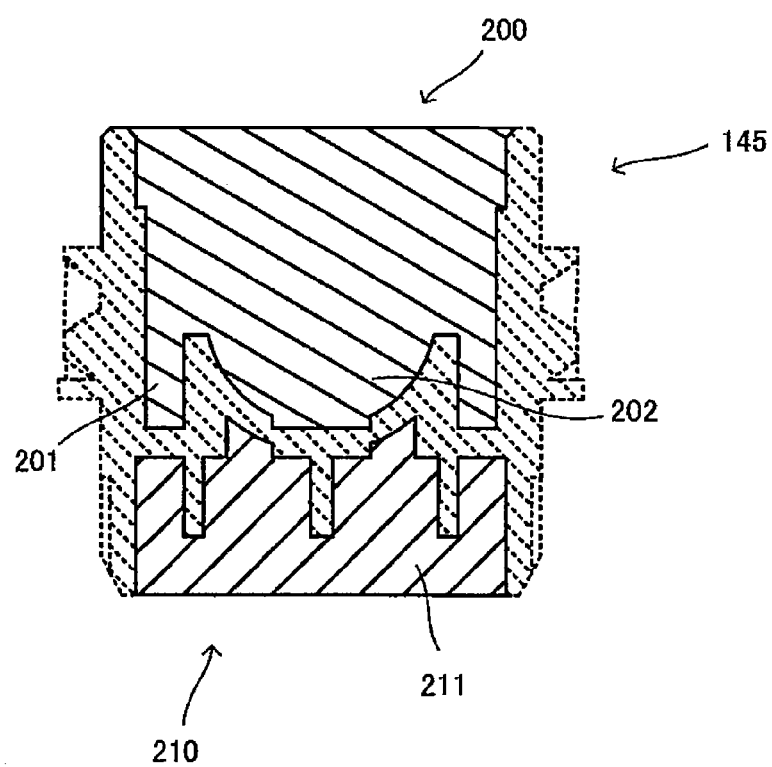
FIG. 29B is a cross sectional view that differs from FIG. 29A.

The bearing member 145 including the retaining portion 150 can be molded as a single piece by injection molding through use of the first molding die 200 and the second molding die 210, such as those mentioned above, along with an unillustrated molding die in combination. After molding, a mold can be released from the die assembly by moving the first molding die 200 and the second molding die 210 in opposite directions. FIGS. 29A and 29B provide drawings that show a combination of the first molding die 200 with the second molding die 210. FIG. 29A is a cross sectional view acquired from the same viewpoint as that from which FIG. 27 is acquired, and FIG. 29B is a cross sectional view acquired from the same viewpoint as that from which FIG. 28 is acquired.

The swaying groove molding portions 212 of the second molding die 210 are inserted into the grooves 200a of the first molding die 200, whereby the first molding die 200 and the second molding die 210 are combined together. Such a combination of the first molding die 200 and the second molding die 210 is subjected to injection molding, whereby the interior shape of the bearing member 145 can be formed. After molding, the bearing member 145 is released from the die assembly by moving the first molding die 200 and the second molding die 210 in a separating manner in opposite directions along their axial direction. In the embodiment, the sphere receiving section 160 and the swaying grooves 151b and 155b of the bearing member 145 assume shapes that have no undercuts. Hence, releasing a mold from the first molding die 200 and the second molding die 210 is smoothly performed without a catch. Specifically, the bearing member 145 of the embodiment assumes a shape that can be smoothly, efficiently manufactured by means of integral molding. Thus, productivity can be enhanced.

Figure 30:
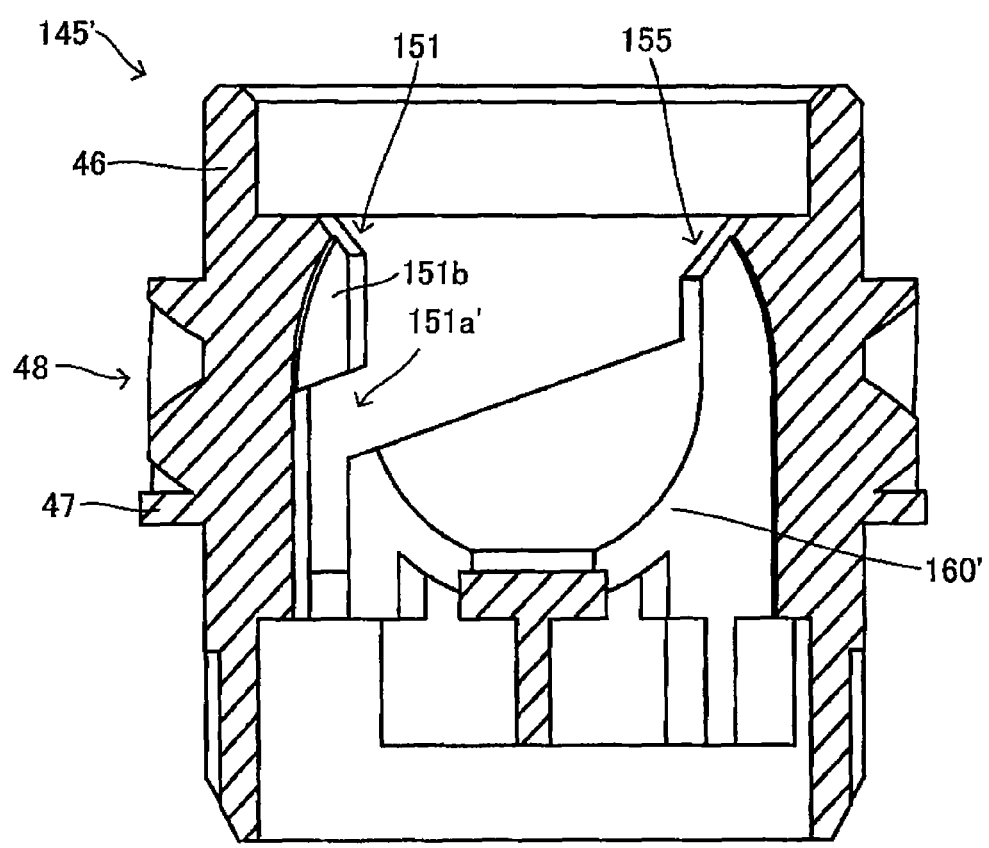
FIG. 30 is a cross sectional view of a bearing member of a modification.

FIG. 30 is a cross sectional view of a bearing member 145' that is an example of modification of the bearing member 145 and equivalent to FIG. 20A. An open-side end face of a sphere receiving section 160' in the bearing member 145' is inclined with respect to a radial direction, and an inlet groove 151a' is also inclined with respect to the radial direction correspondingly. As a result, an angular difference arises between the torque transmission pin 95 that extends in a radial direction and the shaft member 70 when the shaft member 70 is attached to the bearing member 145', whereby inadvertent dislodgement of the shaft member 70 from the bearing member 145' can be prevented further.

Figure 31:
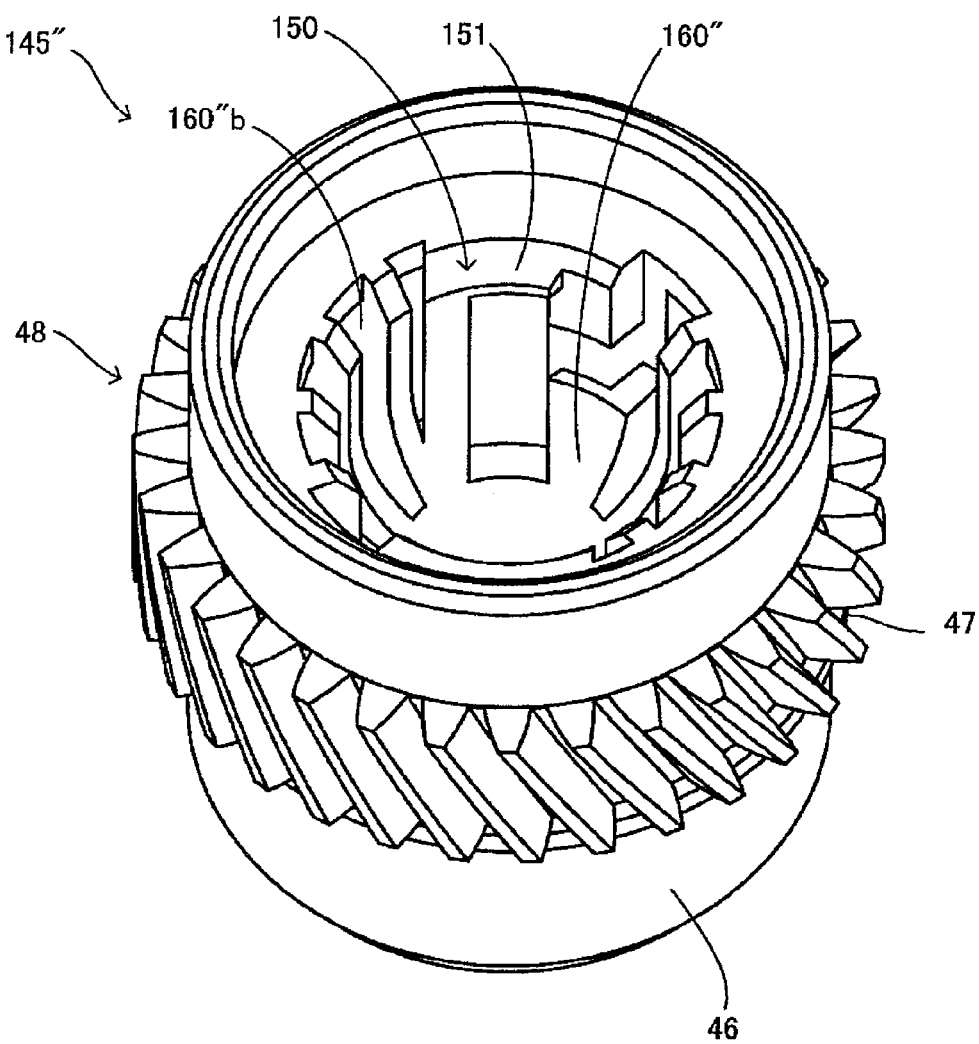
FIG. 31 is a perspective view of a bearing member of another modification.
Figure 32:
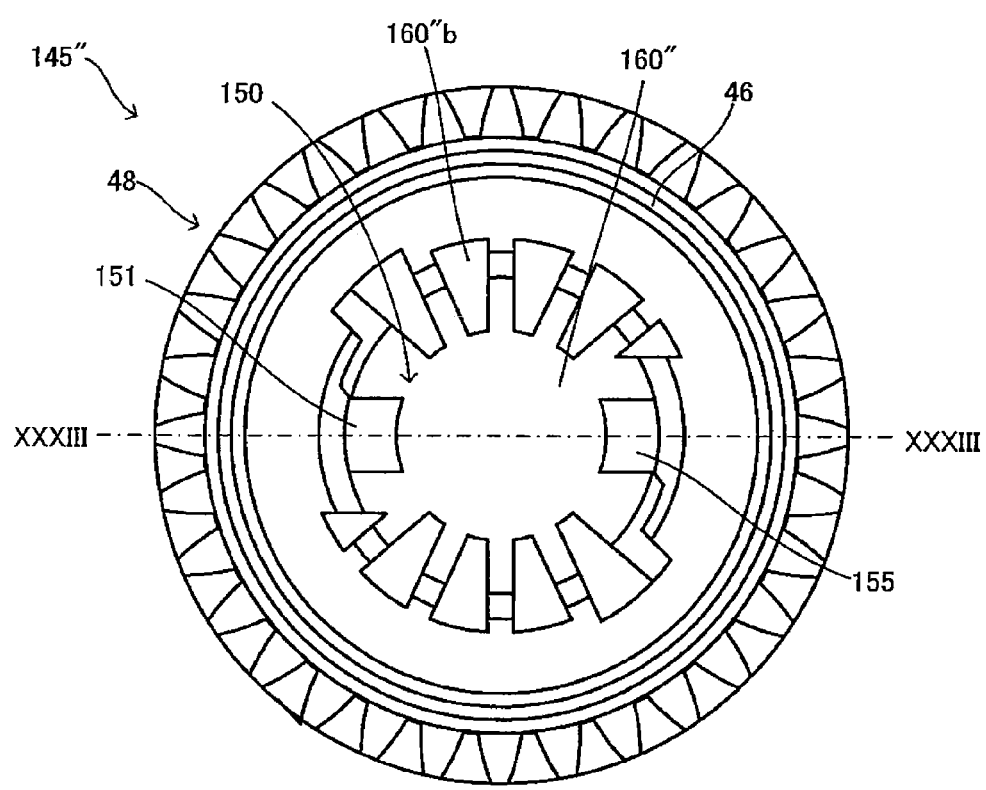
FIG. 32 is a view of the bearing member of the other modification that is viewed along its axial direction.
Figure 33:
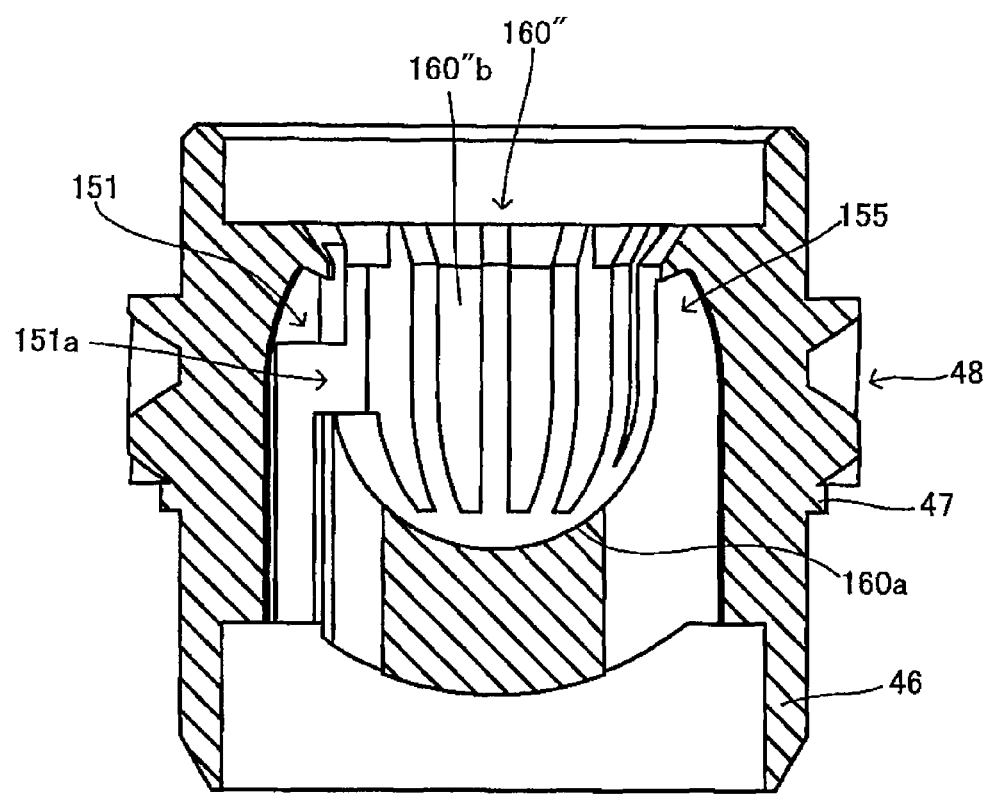
FIG. 33 is a cross sectional view of the shaft member of the other modification.

FIGS. 31 through 33 are drawings for explaining a bearing member 145" that is another example of modification of the bearing member 145. FIG. 31 is a perspective view of the bearing member 145" that is equivalent to FIG. 17, and FIG. 32 is a drawing of FIG. 31 that is viewed from a position where the shaft member 70 is inserted along the axial direction and that is equivalent to FIG. 18. FIG. 33 is a cross sectional view that is taken along line XXXIII-XXXIII shown in FIG. 32 and equivalent to FIG. 20A.

The bearing member 145" has respective configuration elements provided in the bearing member 145. A plurality of grooves 160"b that extend in the axial direction are provided in a region of a sphere receiving section 160" that is not provided with the first groove formation region 151 and the second groove formation region 155. Accordingly, the grooves 160"b extend in the axial direction of the cylindrical body 46 and are arranged at predetermined spacings along the interior periphery of the cylindrical body 46.

Even in the embodiment, likewise the bearing member 145, the bearing member 145" can be likewise manufactured in a single piece by means of injection molding. On that occasion, in the embodiment, the grooves 160"b serve as so-called lightening portions and can inhibit occurrence of a surface sink. Furthermore, in addition to serving in the same way as do the bearing members 45 and 145, projections between the grooves 160"b act as ribs after molding of the bearing member 145", thereby enhancing strength of the bearing member 145".

Figure 34:
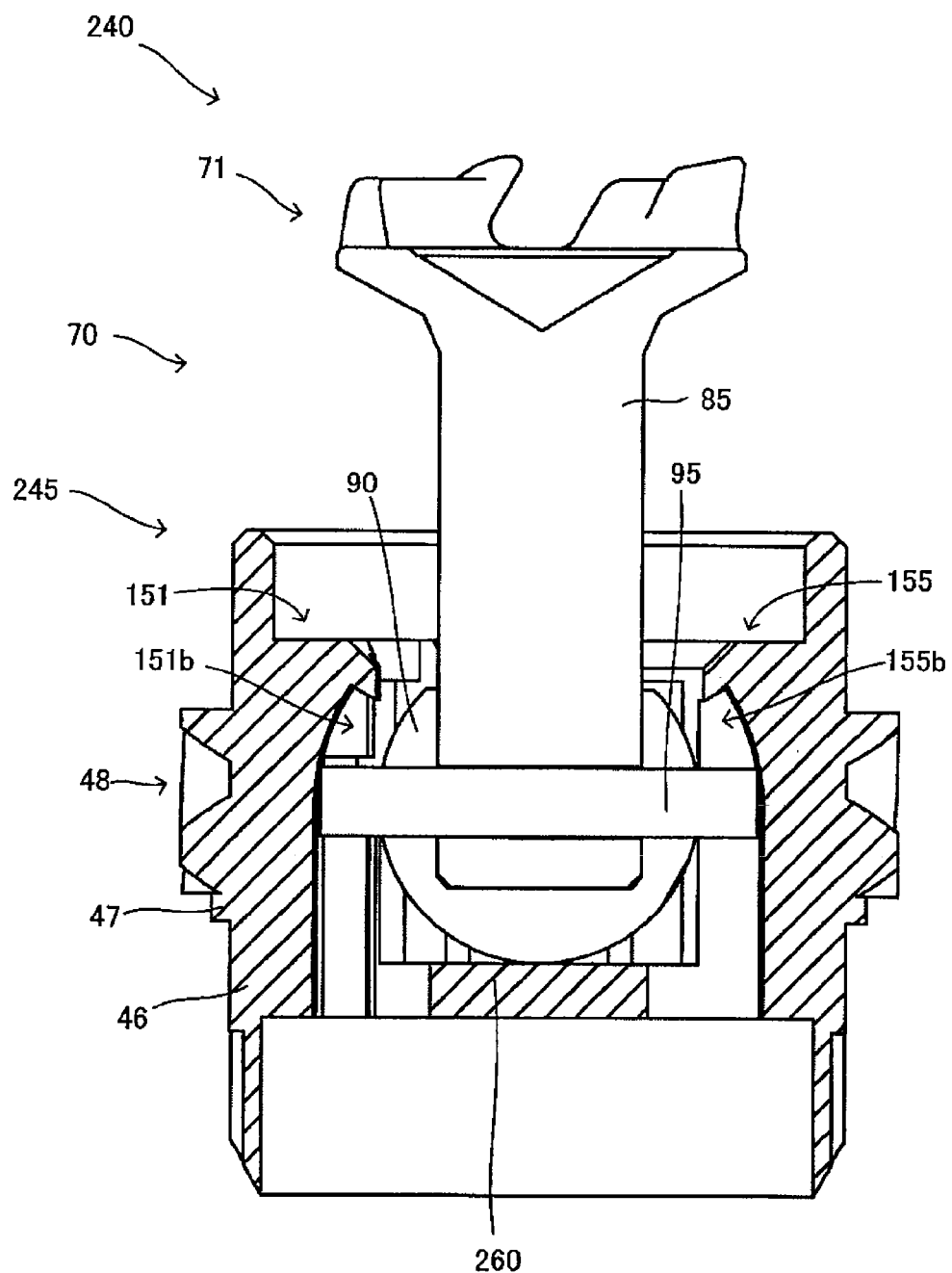
FIG. 34 is a cross sectional view of an example of an end member in which a pedestal is flat.

FIG. 34 shows an example of an end member 240 with a bearing member 245 in which a pedestal 260 is made up of a plane that is flat in a radial direction of the cylindrical body rather than of a curved surface. Advantages that are analogous to those described in connection with the foregoing descriptions are yielded even in this case.

The bearing member 245 also has a region where the swaying grooves 151b and 155b are curved in a circular-arc shape in the same way as mentioned above. Hence, spacing between the swaying groove 151b and the swaying groove 155b is narrow toward an end of the bearing member 245, and spacing between the grooves in the thus-narrowed region is narrower than the length of the torque transmission pin 95.

Accordingly, even when the shaft member 70 is pulled in the axial direction, the torque transmission pin 95 is snagged on the bottom surface 51c of the swaying groove 151b and the bottom surface of the swaying groove 155b, so that the bearing member 70 does not become dislodged from the bearing member 245. As is obvious from the above, axial movements of the shaft member 70 are restricted by the torque transmission pin 95. Moreover, in the embodiment, the pedestal 260 and an interior surface of the cylindrical body 46 restrict movements of the shaft member in directions other than the direction in which the shaft member is to be detached.

Even when the pedestal 260 is flat, it is preferable in connection with restrictions on axial movements that restrictions should be imposed so as to prevent the shaft member 70 from becoming dislodged from the bearing member 245 in the axial direction. Rattles, which would otherwise occur when the shaft member 70 is attached to the bearing member 245, are prevented, and swaying of the shaft member 70 and attachment/detachment of the process cartridge 20 to and from the main body 10 are made much smoother.

For these reasons, the bearing member can be configured in; for instance, the following manner. Specifically, as shown in FIG. 34, the essential requirement is that the sphere 90 should be placed in contact with a surface of the pedestal 260 and that a match should exist between the center position of the sphere 90 achieved in the swayable state and the center position of the shaft line of the pin 95 achieved in a state in which the shaft member 70 is pulled in a direction in which the shaft member 70 becomes dislodged. This makes it difficult for the shaft member 70 to substantially move in the axial direction, and hence rattling can be prevented.

Incidentally, explanations have been provided thus far to the example of the curved pedestal; namely, the concave pedestal, and the example of the flat pedestal. However, the form of the plane is not particularly restricted to them. Accordingly, the pedestal can also have a convex curve or a step.

Figure 35:
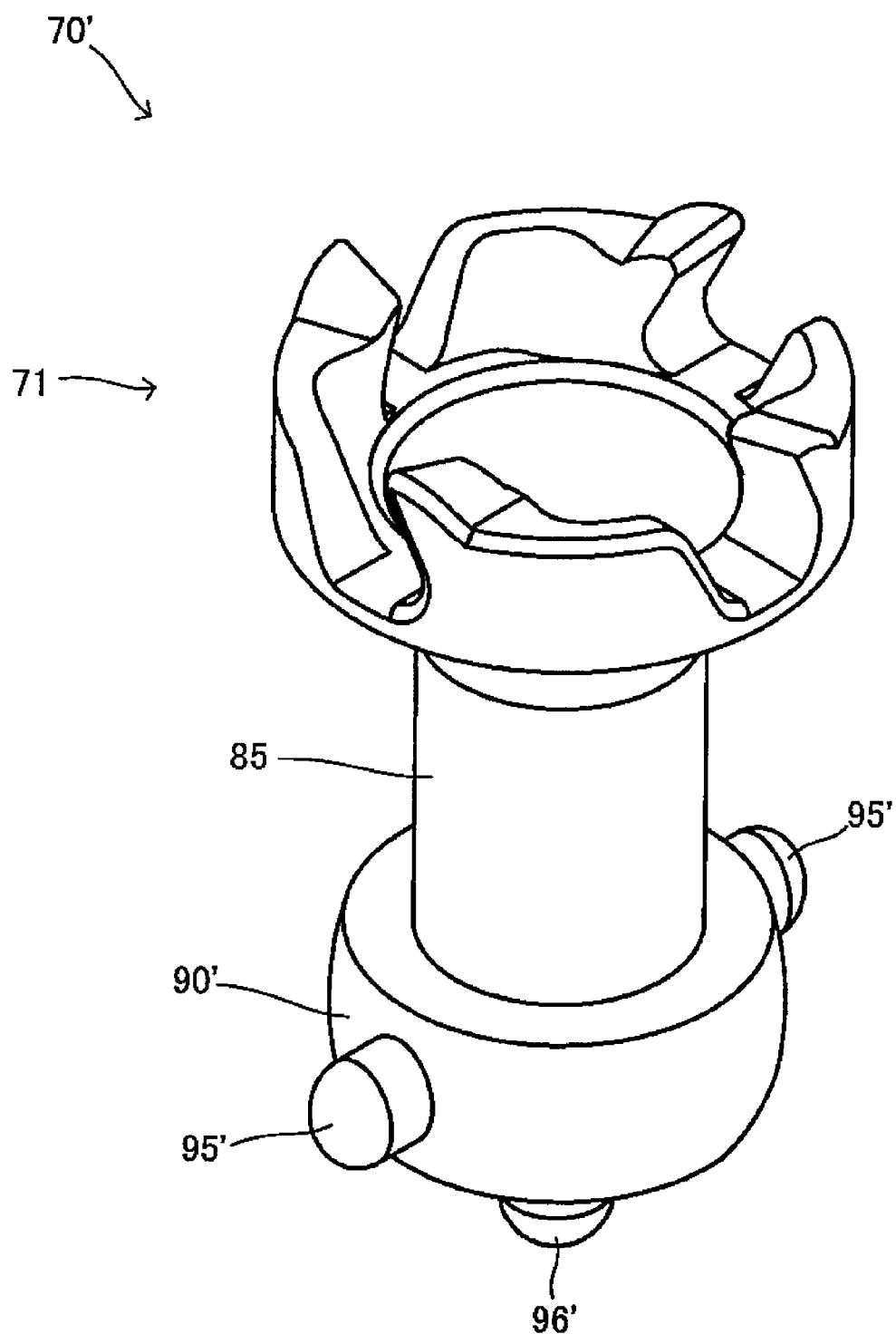
FIG. 35 is a perspective view for explaining another example of the shaft member.

FIG. 35 is a perspective view of a shaft member 70' that is another example of the shaft member. The shaft member 70' has the coupling member 71, the rotary shaft 85, a disc 90', a torque transmission pin 95', and a support shaft 96'.

The disc 90' is a disc-shaped member that acts as a base end, and one surface of the disc 90' is attached to one end of the rotary shaft 85 opposite to the end on which the coupling member 71 is placed. It is preferable that the axis line of the rotary shaft 85 and the axis line of the disc 90' should be brought in alignment with each other as precisely as possible, whereby the photosensitive drum 35 can generate stable rotations. Further, a lateral surface of the disk 90' assumes a spherical surface. A diameter of the disc 90' is set so as to become substantially the same as the spacing between the first groove formation region 51 and the second groove formation region 55 of the retaining portion 50 of the bearing member 45.

The torque transmission pin 95' is a columnar shaft-shaped member that is parallel to a direction of a plane of the disc 90', that passes through the axis line of the disc 90', and whose both ends jut out of an outer periphery of the disc 90' while passing through the disc 90'. The axis line of the torque transmission pin 95' is laid so as to cross the axis line of the rotary shaft 85 at right angles.

The support shaft 96' is a columnar member that acts as a base end which stands upright on a plane of the disc 90' where the rotary shaft 85 is not placed, and an extremity of the support shaft 96' is formed into a semispherical shape. The extremity of the support shaft 96' thereby comes into contact with the pedestal 60 of the bearing member 45, whereby stable turns (swaying action) can be obtained.

Such a shaft member 70' can also be attached to the bearing member 45 and perform turns (swaying action) in much the same way as does the shaft member 70.

According to the invention, attaching the shaft member to the bearing member in the end member is easy. Moreover, the shaft member performs smooth swaying action after being attached and can transmit rotary drive force from the main body to the photosensitive drum in the same way as in the related art. Further, attaching and detaching the process cartridge to the main body is easy.

Moreover, since the shaft member can be easily attached to and detached from the bearing member, the bearing member can be attached to the photosensitive drum more aptly than in the related art before the swayable shaft member is attached to the bearing member.

In addition to this, since forceful attachment is not required when the shaft member is attached to the bearing member, accuracy in assembling the shaft member and the bearing member will hardly be deteriorated.

According to the invention, the bearing member can be provided that enables torque transmission equivalent to torque transmission performed in the related art and attachment/detachment of the bearing member to a main body and that can be readily produced while inhibiting occurrence of defects, such as fractures, with superior precision.

What is claimed is:

1. A bearing member that is placed at an end of a photosensitive drum and to which a shaft member is attached, comprising:
   a cylindrical body;
   a retaining portion that is placed in the cylindrical body and that retains a torque transmission pin provided in the shaft member and that is provided in a removable manner,
   the retaining portion being provided with
      at least two swaying grooves that extend along an axial direction of the cylindrical body and that are provided opposite each other and whose bottoms each have a curved surface that exhibits a bow in a direction parallel to the axial direction;
      inlet grooves that are connected to the respective swaying grooves at a first end and connected to the outside of the retaining portion at a second end and that are placed at an upstream position with respect to the swaying grooves along a direction of rotation of the cylindrical body; and
      a pedestal interposed between the two swaying grooves.

2. The bearing member according to claim 1, wherein the pedestal has a curved surface.

3. The bearing member according to claim 2, wherein a center of each of the curved surfaces of the swaying grooves substantially coincides with a center of the curved surface of the pedestal.

4. The bearing member according to claim 1, wherein the curved surfaces of the swaying grooves assume a curved surface structure that is centered on a pivot of the shaft member and that has a diameter which is substantially identical with a length of the torque transmission pin to be placed.

5. The bearing member according to claim 1, wherein a distance between bottom surfaces of the mutually-opposed swaying grooves includes a region which extends from an axial end of the cylindrical body to an axial inside.

6. The bearing member according to claim 1, wherein the inlet grooves are placed so that ends of the torque transmission pin can coincide with positions of the inlet grooves at an inclined attitude of the shaft member except an attitude at which a match exists between an axial direction of the shaft member and the axial direction of the cylindrical body and attitudes at which the shaft member is swayed and most inclined.

7. The bearing member according to claim 1, wherein the inlet grooves have a transition fit size with respect to the torque transmission pin to be placed.

8. The bearing member according to claim 1, further comprising: a concave portion enclosed by the two swaying grooves and the pedestal, wherein
   the concave portion does not have any undercuts when viewed from an open side opposite to the pedestal along the axial direction of the bearing member; and
   one of sidewalls of each of the inlet grooves is formed from a surface of the pedestal.

9. The bearing member according to claim 8, wherein the swaying grooves do not have any undercuts when the bearing member is viewed from a side opposite to the open side of the concave portion.

10. The bearing member according to claim 8, wherein a surface of the pedestal on which each of the inlet grooves are formed is inclined with respect to a radial direction of the bearing member.

11. The bearing member according to claim 8, wherein all of the bearing members are formed integrally.

12. The bearing member according to claim 1, wherein each of the inlet grooves is formed such that a portion of the inlet groove facing the outside of the retaining portion is wider than another portion of the inlet groove facing the swaying groove.

13. The bearing member according to claim 1, wherein the bearing member is coated with a lubricant.

14. The bearing member according to claim 1, wherein the bearing member is formed from a resin containing at least one type of fluorine, polyethylene, and silicone rubber.

15. The bearing member according to claim 1, wherein the bearing member is coated with fluorine.

16. An end member comprising:
   a shaft member and the bearing member defined in claim 1, wherein
   the shaft member includes
      a rotary shaft;
      a torque receiving section that is placed at one end of the rotary shaft, that is capable of engagement with a torque imparting section of an image forming apparatus main body and that experiences torque from a drive shaft in an engaged attitude;
      a base end placed at another end of the rotary shaft; and
      a torque transmission pin whose ends jut out from the base end, wherein
   the shaft member is combined with the bearing member as a result of the torque transmission pin of the shaft member being placed in the swaying grooves of the bearing member.

17. The end member according to claim 16, wherein the shaft member is inserted into the bearing member from an end opposite to an end to which a photosensitive drum is fitted, and a combination can be realized without causing a flexure in the bearing member even when the shaft member is combined with the bearing member.

18. The end member according to claim 16, wherein axial movements of the shaft member are restricted by means of the torque transmission pin.

19. The end member according to claim 16, wherein movements of the base end in the direction in which the shaft member is dislodged along the axial direction are not restricted by the bearing member.

20. A photosensitive drum unit having a photosensitive drum and the end member defined in claim 16.

21. A process cartridge having the photosensitive drum unit according to claim 20, wherein the shaft member is removably attached to a drive shaft of the image forming apparatus main body.

22. A method for manufacturing the bearing member defined in claim 11, comprising:
   forming the bearing member by injection molding, wherein
   the forming step involves inserting a second molding die for making the swaying grooves into a groove formed in a first molding die for making the concave portion, combining the first molding die with the second molding die, subjecting the first molding die and the second molding die to injection molding, and releasing the bearing member from the dies by separating the first molding die and the second molding die in opposite directions.

* * * * *